US012246852B2

(12) United States Patent
Smith et al.

(10) Patent No.: US 12,246,852 B2
(45) Date of Patent: Mar. 11, 2025

(54) FRAME INSTALLATION STATION FOR AIRCRAFT FUSELAGE SEGMENTS

(71) Applicant: The Boeing Company, Chicago, IL (US)

(72) Inventors: Daniel R. Smith, Woodinville, WA (US); Darrell D. Jones, Mill Creek, WA (US); Farahnaz Sisco, Mukilteo, WA (US); Kwok Tung Chan, Seattle, WA (US); Riley HansonSmith, Bothell, WA (US)

(73) Assignee: The Boeing Company, Chicago, IL (US)

( * ) Notice: Subject to any disclaimer, the term of this patent is extended or adjusted under 35 U.S.C. 154(b) by 543 days.

(21) Appl. No.: 17/454,268

(22) Filed: Nov. 10, 2021

(65) Prior Publication Data

US 2022/0153436 A1   May 19, 2022

Related U.S. Application Data

(60) Provisional application No. 63/115,031, filed on Nov. 18, 2020.

(51) Int. Cl.
 *B64F 5/10* (2017.01)
 *B64C 1/06* (2006.01)
 *B64C 1/12* (2006.01)

(52) U.S. Cl.
 CPC ............... *B64F 5/10* (2017.01); *B64C 1/068* (2013.01); *B64C 1/12* (2013.01); *B64C 1/061* (2013.01)

(58) Field of Classification Search
 CPC .............. B64F 5/10; B64C 1/061; B64C 1/12
 See application file for complete search history.

(56) References Cited

U.S. PATENT DOCUMENTS

| 5,896,637 A | * | 4/1999 | Sarh | B64F 5/10 227/51 |
| 2014/0331473 A1 | * | 11/2014 | Smith | B64F 5/10 29/281.1 |

FOREIGN PATENT DOCUMENTS

| EP | 3378789 A2 | 9/2018 |
| WO | 2006001860 A2 | 1/2006 |

OTHER PUBLICATIONS

Extended European Search Report dated Apr. 20, 2022 regarding EP Application No. 21207508.9; 10 pgs.
International Search Report and Written Opinion dated Oct. 28, 2021 regarding NL Application No. NL2028100; 17 pages.

* cited by examiner

*Primary Examiner* — Nirvana Deonauth
(74) *Attorney, Agent, or Firm* — Yee & Associates, P.C.

(57) ABSTRACT

Systems and methods are provided for assembling aircraft fuselages. One embodiment is a method for assembling a fuselage of an aircraft. The method includes indexing an arcuate section of a fuselage to a frame installation station, feeding a frame at the frame installation station into a concavity defined by the arcuate section, placing the frame against an Inner Mold Line (IML) of the arcuate section while the frame is within the concavity, and affixing the frame to the arcuate section.

21 Claims, 18 Drawing Sheets

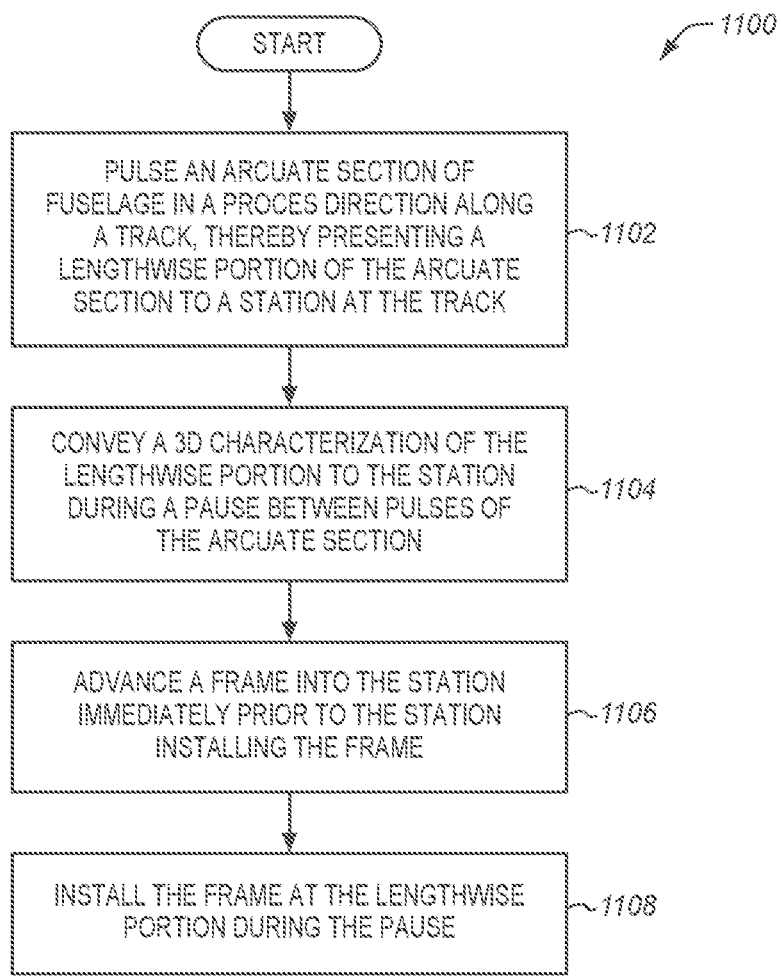

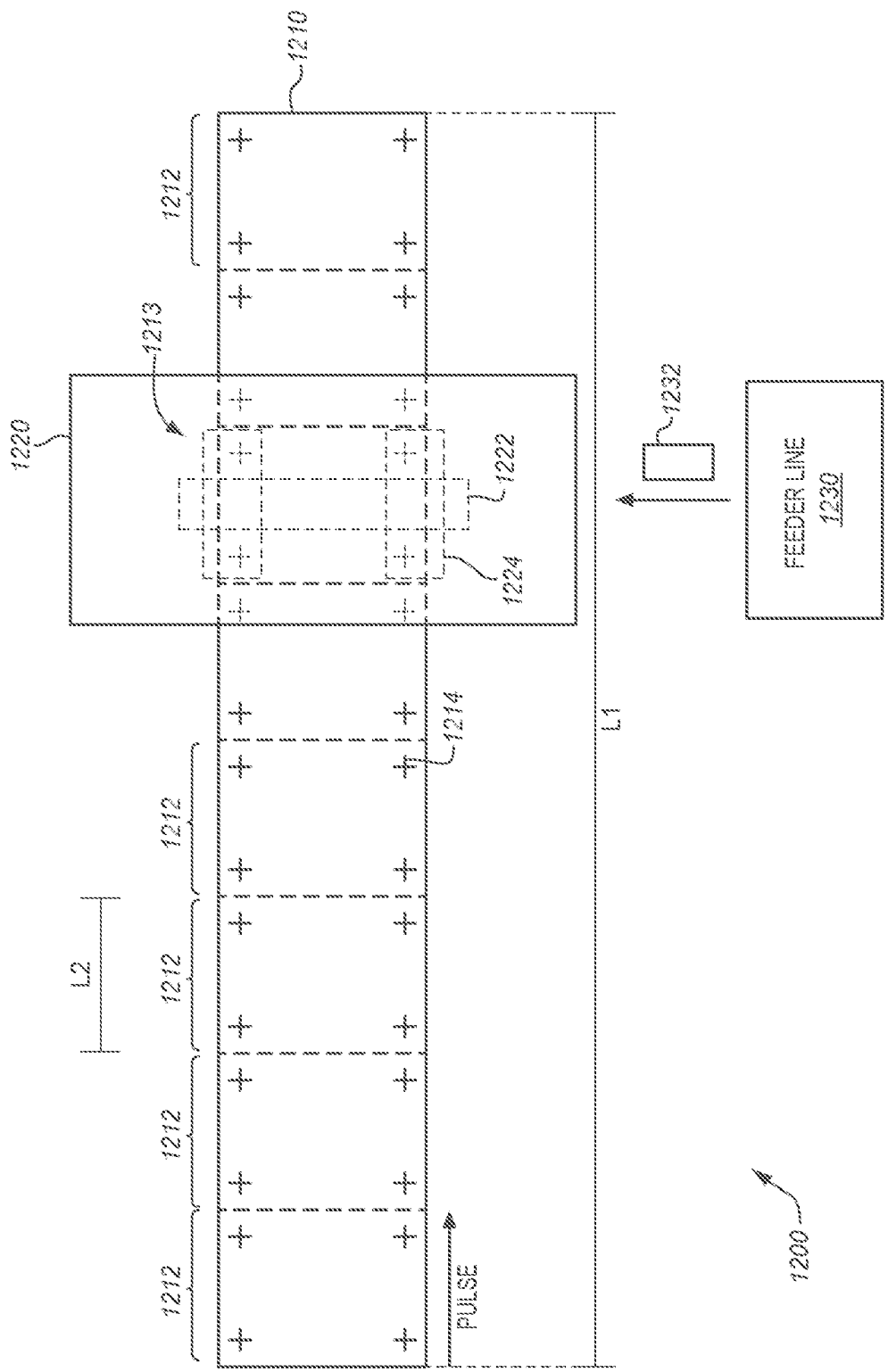

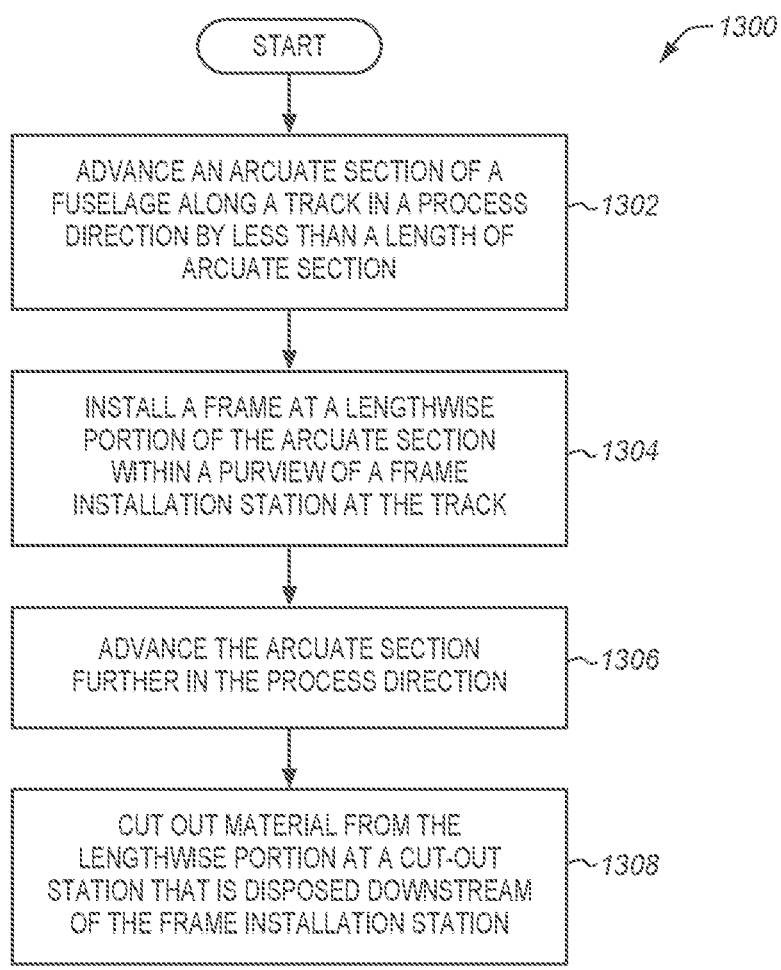

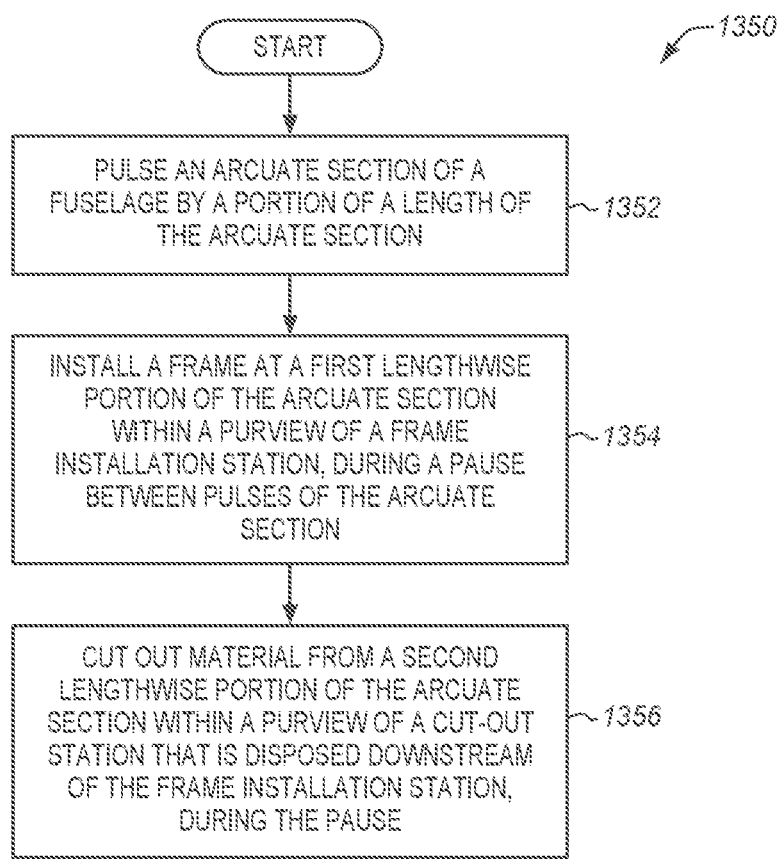

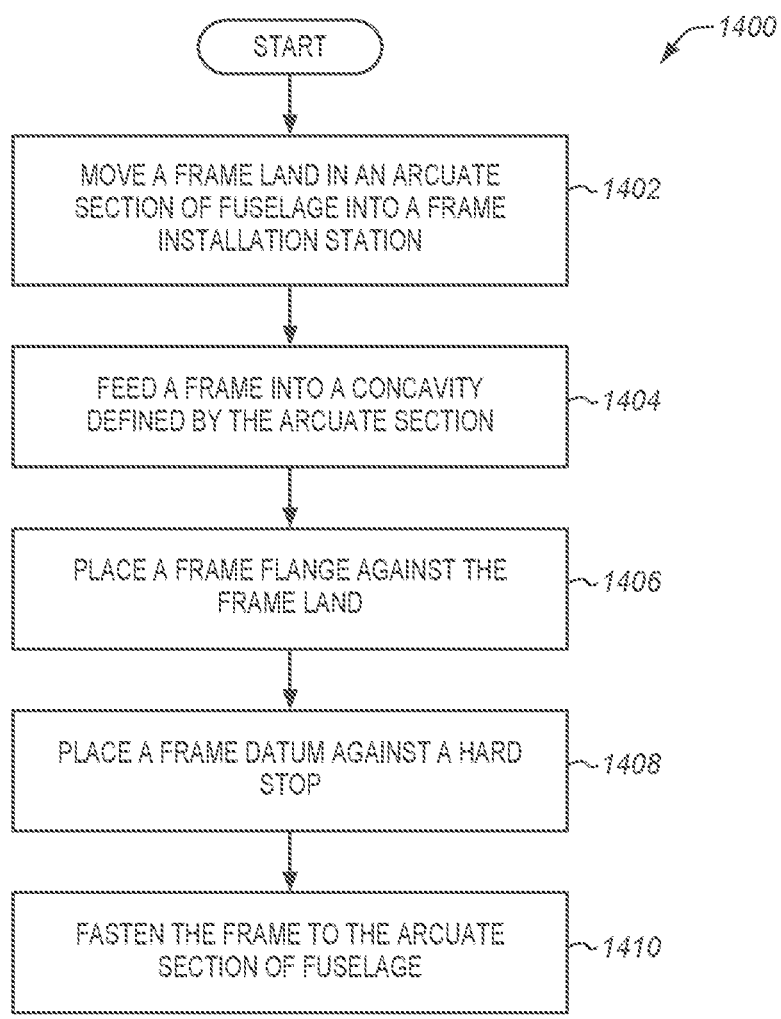

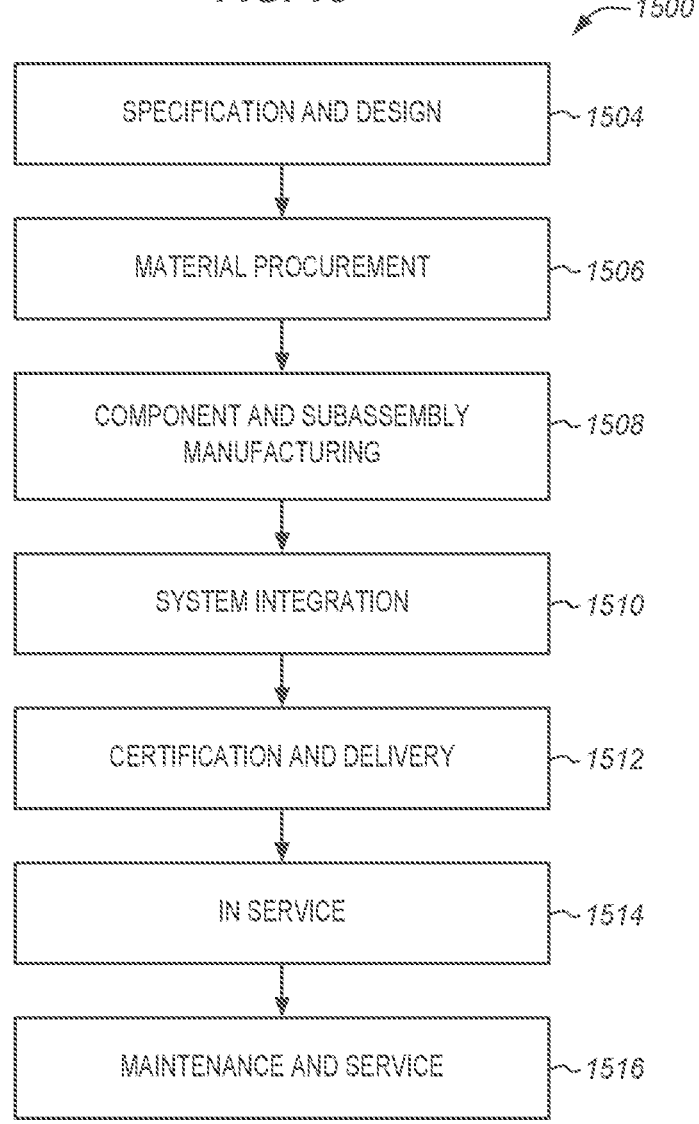
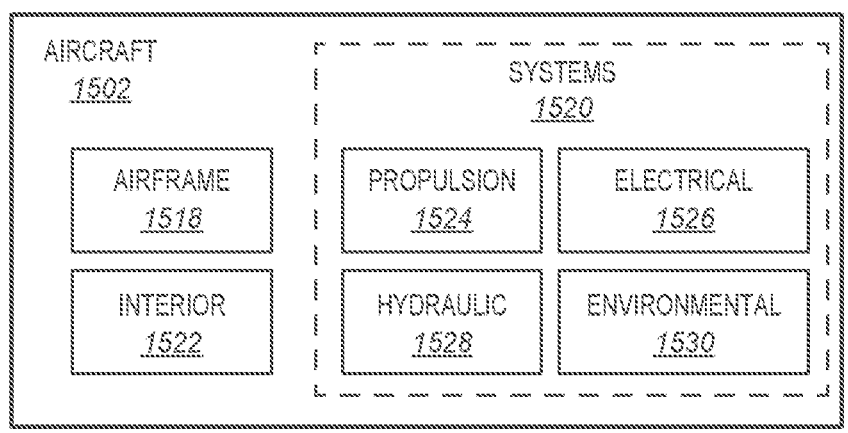

FRAME INSTALLATION STATION FOR AIRCRAFT FUSELAGE SEGMENTS

CROSS-REFERENCE TO RELATED APPLICATION

This application claims the benefit of U.S. Provisional Patent Application Ser. No. 63/115,031 filed Nov. 18, 2020, and entitled "Frame Installation Station for Aircraft Fuselage Segments" which is incorporated herein by reference in its entirety.

FIELD

The disclosure relates to the field of assembly, and in particular, to assembly of airframes.

BACKGROUND

An airframe defines the mechanical structure of an aircraft. Airframes are made of multiple components that provide desired structural properties. For example, a portion of an airframe for a fuselage of an aircraft may include frames, door surrounds, window frames and subassemblies, brackets, blankets, system elements, skin, and stringers, etc. that are mechanically coupled together (e.g., via co-bonding, co-curing, or fasteners) in accordance with design parameters. As presently practiced, components of an airframe are fabricated and assembled in predefined cells on a factory floor. For example, a skin of an aircraft may be assembled at one cell, and then may be transported to a new cell where frames are installed into the skin to form a section of fuselage.

While the fabrication processes discussed above are reliable, they encounter delays when work at a specific portion of a component is completed more slowly than expected. For example, if a particular portion of a fuselage section takes longer than expected for installation of frames, then the entire section remains at the cell until all of the work that has been delayed is completed. Alternatively, work that has been delayed must later be completed in another work cell (i.e., in addition to work already scheduled for that later work cell, which increases the difficulty of fabricating parts in a timely and efficient manner.

Therefore, it would be desirable to have a method and apparatus that take into account and addresses at least some of the issues discussed above, as well as other possible issues.

SUMMARY

Embodiments described herein provide frame installation stations that facilitate pulsed-line assembly techniques and methods for manufacturing sections of fuselage. After each pulse, a section of fuselage is moved along a line assembly by a particular length, that is, less than the overall length of the section, to allow certain processing operations to be implemented on a particular location on the section of fuselage. One or more frame installation stations are disposed at different location of the line assembly to allow certain portions of the section of fuselage to have frames installed onto the section. This assembly technique provides a technical benefit by integrating transportation processes into assembly processes, and by reducing the amount of work that needs to be performed on a fuselage section each time the section is moved along the line assembly. Moreover, these frame installation stations that facilitate pulsed-line assembly techniques and methods for manufacturing sections of fuselage also can be used in continuous-line assemblies which move in a continuous, rather than a pulsed, fashion.

One embodiment is a method for assembling a fuselage of an aircraft. The method includes indexing an arcuate section of a fuselage to a frame installation station, feeding one or more frames at the frame installation station into a concavity defined by the arcuate section, placing the frame against an Inner Mold Line (IML) of the arcuate section while the frame is within the concavity, and affixing the frame to the arcuate section. The arcuate section can take the form of a half-barrel section of a fuselage which may be joined with another half-barrel section to create a complete barrel section that can be joined with other barrel sections to form a composite fuselage of an aircraft.

A further embodiment is a non-transitory computer readable medium embodying programmed instructions which, when executed by a processor, are operable for performing a method for assembling a fuselage of an aircraft. The method includes indexing an arcuate section of a fuselage to a frame installation station, feeding a frame at the frame installation station into a concavity defined by the arcuate section, placing the frame against an Inner Mold Line (IML) of the arcuate section while the frame is within the concavity, and affixing the frame to the arcuate section.

Yet another embodiment is a system for assembling a fuselage of an aircraft. The system includes a section of fuselage that advances to an indexed position, an indexing unit that comprises a complementary feature that mates with features at the section, and a frame installation station, disposed at the indexing unit. The frame installation station includes a loader that feeds a frame into a concavity defined by the section, a tool that places the frame against an inner surface of the section while the frame is within the concavity, and a fastening machine that affixes the frame to the section.

A further embodiment is an apparatus in the form of a loader for loading a frame which is coupled onto a section of fuselage. The apparatus includes pinch rollers disposed underneath a bearing edge of an arcuate section of fuselage that is supported by rollers attached to stanchions and that includes a concavity that faces downwards, and a motor that drives the pinch rollers to advance a frame beneath the bearing edge and into the concavity, for example, via a gap between the stanchions.

The systems disclosed herein can utilize modular and redundant system equipment to form the frame installation station and other work stations of the systems to allow for quick replacement in the event that one or more of the system equipment should fail. The use of such modular and redundant system equipment allows the systems to continue production while the failed system equipment is being replaced with a properly operating unit. The systems and apparatus disclosed herein can be designed to allow other working system equipment to perform the functions of the system equipment which is being replaced to help prevent slowdown or shut down of production while the failed system equipment is being replaced.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

FIG. 11 is a flowchart illustrating a method for operating a line assembly system to install frames in an illustrative embodiment.

FIG. 12 is a diagram that depicts indexing of a component to a work station in an illustrative embodiment.

FIGS. 13A-13B are flowcharts illustrating further methods for operating a line assembly system to install frames in an illustrative embodiment.

FIG. 14 is a further flowchart illustrating a method for operating a line assembly system to install frames in an illustrative embodiment.

FIG. 15 is a flow diagram of aircraft production and service methodology in an illustrative embodiment.

FIG. 16 is a block diagram of an aircraft in an illustrative embodiment.

DESCRIPTION

Figure 1:
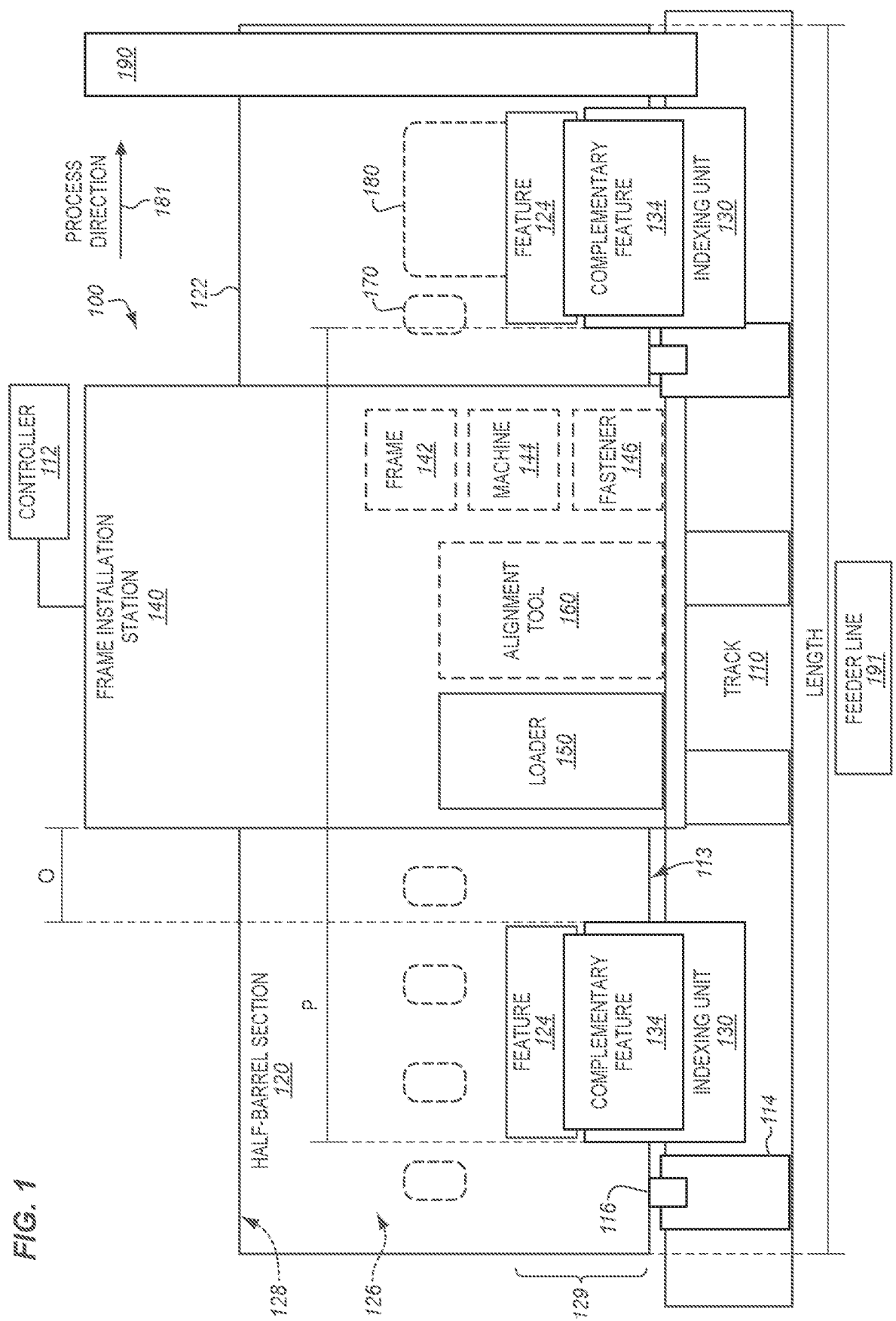
FIG. 1 is a block diagram of a line assembly system that includes a frame installation station in an illustrative embodiment.

The figures and the following description provide specific illustrative embodiments of the disclosure directed to the manufacture of arcuate sections, also referred to as half-barrel sections, of an aircraft fuselage. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Traditional aerospace manufacturing processes usually utilize large complex single process cells with complex end effectors and large motion envelopes which can result in poor work density (work density defined as the number of value added ("VA") touch points on the product at any instance) along with poor process equipment pack density (pack densities defines as people and equipment working on product in parallel). Traditional setups may also require large queue areas and can generate larger nonrecurring (NR), along with larger recurring, flow and floor space requirements. Thus, the traditional aerospace manufacturing cellular approach which focuses on single processes being performed within particular cells may be thought as having certain drawbacks.

As mentioned above, as presently practiced, particular components of an airframe are fabricated and assembled in these single process cells on a factory floor. For example, a skin of an aircraft may be assembled at one process cell, and then, is transported to a new process cell where frames, for example, are installed onto the skin to form a section of fuselage. If a particular portion of a fuselage section takes longer than expected, then the entire fuselage section remains at that particular process cell until all of the needed work, which has been delayed, is completed. Alternatively, necessary work that has been delayed must later be completed in another process cell (in addition to work already scheduled for that process cell) which increases the difficulty of fabricating parts in a timely and efficient manner. Such traditional aerospace manufacturing processing can thus fail to establish a work flow which results in a high production rate.

Some benefits of the present disclosure include the synchronization of multiple different process stations to a designed pulse time or line velocity. Accordingly, a proper line velocity can be attained when moving the product for processing at different process stations along the line-assembly to increase production. The disclosed system utilizes structural components which can achieve a higher work density and process equipment packing density over traditional aerospace cellular stations. The system includes a simplified frame datuming fixture station, described in greater detail below, for defining datum planes for the frames which are attached to the arcuate sections as the sections move in line along the line assembly. The system utilizes a modular design with lean right-sized equipment to support line move reliability and modular growth options. The modular design creates particular work zones which utilizes purpose built lean right-sized, modular, equipment designed to work in close proximity of other equipment and workers. The modular design of the disclosed system allows for quick change repair and maintenance built into the line-assembly design. The system allows for the datuming and indexing of frames, door surrounds, window surrounds, system fittings/brackets/subassemblies, along with the installation of blankets, NDI and drill/trim. The system includes at least one work station to remove manufacturing excess to simplify further processing at upstream work/process stations.

Airframes may be made from metal, or may be implemented as composite parts. Composite parts, such as Carbon Fiber Reinforced Polymer (CFRP) parts, are initially laid-up in multiple layers that together are referred to as a preform. Individual fibers within each layer of the preform are aligned parallel with each other, but different layers may exhibit different fiber orientations in order to increase the strength of the resulting composite part along different dimensions. The preform may include a viscous resin that solidifies in order to harden the preform into a composite part. Carbon fiber that has been impregnated with an uncured thermoset resin or a thermoplastic resin is referred to as "prepreg." Other types of carbon fiber include "dry fiber" which has not been impregnated with thermoset resin but may include a tackifier or binder. Dry fiber may be infused with resin prior to curing. For thermoset resins, the hardening is a one-way process referred to as curing, while for thermoplastic resins, the resin may reach a viscous form if it is re-heated. While the present embodiments disclose apparatus, systems and processing methods utilizing composite parts to manufacture sections of fuselage, these same apparatus, systems and methods can be used in manufacturing metallic sections of fuselage as well.

Current industry practice utilized techniques to manufacture an aircraft fuselage utilizing either quarter panels or one-piece barrel construction. The disclosed systems and processing methods are particularly useful in manufacturing a half-barrel section of the fuselage since the half-barrel structure provides an optimized product design to enable higher work density and process equipment packing density (because each station can have 3 or more work zones) and increase parallel processing. The greater number of work zones per station and the number of stations in line processing the half-barrel section in parallel is beneficial and may increase productivity.

FIG. 1 is a block diagram of a line assembly system 100 that includes a frame installation station 140 in an illustrative embodiment. Line assembly system 100 comprises any system, device, or component operable to iteratively pulse a half-barrel section 120 of fuselage a distance less than its length along a track 110. The half-barrel section 120 is also referred herein as a "section", a "section of fuselage" and an "arcuate section" of fuselage and is identified by reference numeral 120. Line assembly system 100 is further capable of installing frames along an Inner Mold Line (IML) 128 on the half-barrel section 120 while the half-barrel section 120 is paused between pulses. The IML 128 defines the inner surface of the half-barrel section 120. While the line assembly system 100 is primarily disclosed in terms of a pulsed-motion line assembly system, the same line assembly system, with certain modifications (disclosed in greater detail below), could be implemented to create a continuously-moving on-line assembly system.

Figure 17:
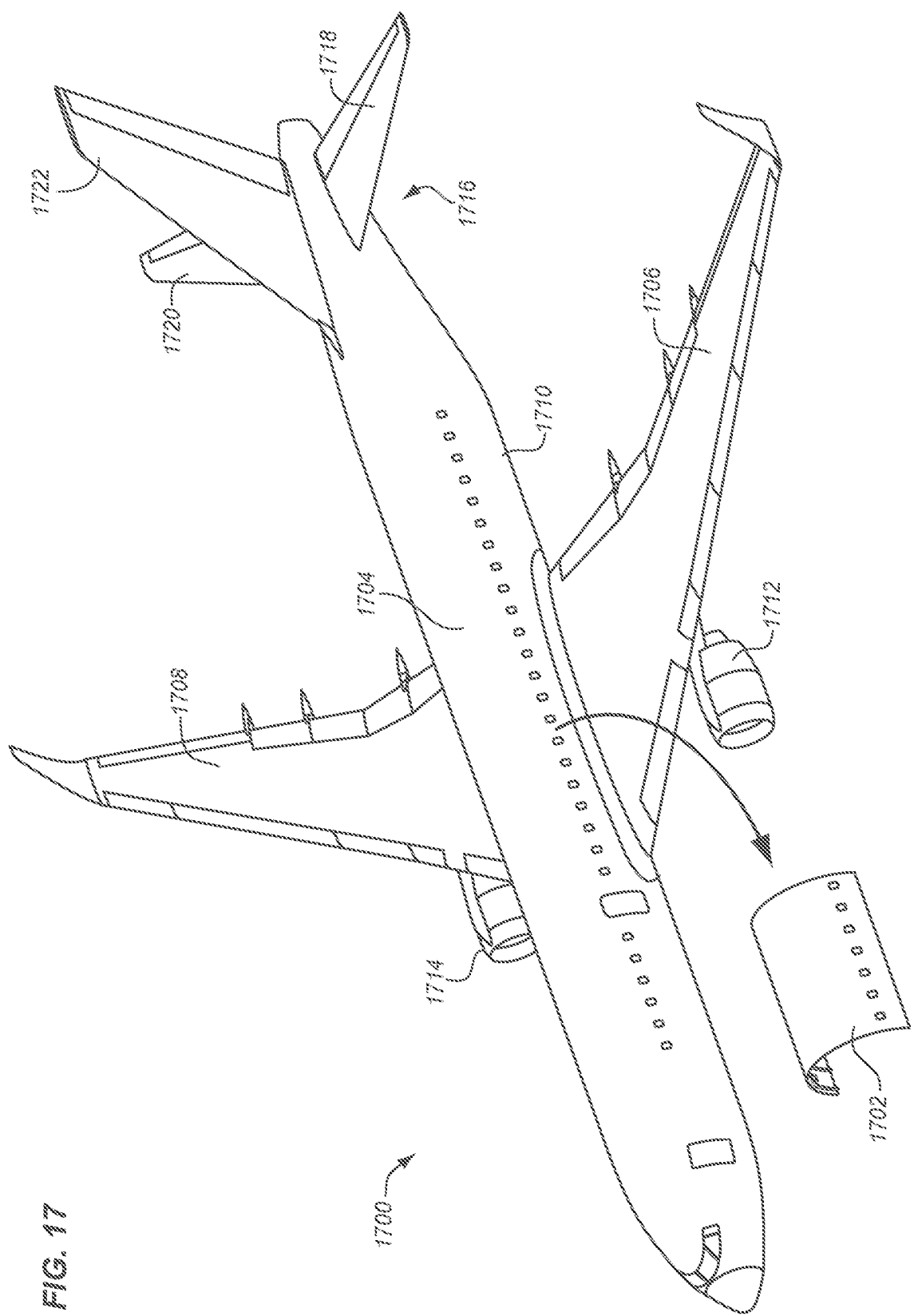
FIG. 17 is a perspective view of an aircraft in an illustrative embodiment.

The half-barrel section 120 comprises a portion of an airframe, such as a section of fuselage approximately forty feet long. In some embodiments, the half-barrel section 120 comprises a hardened composite part or a metal part, such as a section of the skin of an aircraft awaiting installation of frames to enhance rigidity. The half-barrel section 120 includes an Outer Mold Line (OML) 122 and IML 128, and defines a concavity 126 in which frames 142 are aligned and installed. FIG. 17 shows an aircraft which was manufactured with multiple half-barrel sections 120 that were joined together to form the composite fuselage of the aircraft.

In this embodiment, line assembly system 100 comprises track 110, upon which the half-barrel section 120 is moved in a process direction (labeled "process direction 181" in FIG. 1). The track 110 comprises one or more rails, rollers, or other elements that facilitate motion (e.g., rolling or sliding) of the half-barrel section 120 along the track 110. In further embodiments, the track 110 includes a chain drive, motorized cart, powered or unpowered rollers 116 mounted to a series of stanchions 114 (also referred to as "pogos") that proceed in the process direction 181, or other powered system that is capable of moving the half-barrel section 120 in the process direction 181. As is disclosed herein, the line assembly system will utilize redundant modular drive equipment to support high line move reliability and to maintain the movement of the line assembly system even if one of the modular equipment fails and needs to be replaced.

Line assembly system 100 further comprises indexing units 130. Each indexing unit 130 is designed to physically couple with a feature 124 (e.g., a machined feature, such as a hole or slot) in the half-barrel section 120. The features 124 are placed at known locations along the half-barrel section 120 (e.g., along an arc and/or along the length of the half-barrel section 120), and in one embodiment each of the features 124 is separated by the same distance along the half-barrel section 120. In further embodiments, spacing of features in the manufacturing excess varies along the length of the half-barrel section, as does distance from a bearing edge 113 of the half-barrel section 120 that contacts the track 110. The shape, placement, and/or size of each feature 124 can vary as needed to convey a particular message to a frame installation station 140 when mated to a complementary feature. For example, placement of an indexing feature having a first shape in a first location can indicate that installation of a first type of frame is desired, while placement of an indexing feature having a second shape in a second location can indicate that installation of a second type of frame is desired. When the indexing unit 130 is mated to an indexing feature 124, a 3D characterization of the IML and/or OML loft of the portion of the half-barrel section within the purview of frame installation station 140 is known, as is an operation to be performed by the frame installation station 140. In further embodiments, the features 124 are disposed in a manufacturing excess 129 of the half-barrel section 120, which is trimmed away prior to the half-barrel section 120 entering service. In further embodiments, manufacturing excesses exist in the form of windows 170 and doors 180 which will be cut out from the half-barrel section 120 by trimming after frame installation has occurred.

In this embodiment, each of the indexing units 130 includes a complementary feature 134 for insertion into, grasping, or otherwise fitting with a feature 124. Indexing units 130 are placed at fixed, known locations relative to the frame installation station 140 and track 110. During assembly, half-barrel section 120 is pulsed a distance (P) (e.g., a distance at least equal to the shortest distance between features 124), indexed to the indexing units 130, and worked upon by the frame installation station 140. That is, the half-barrel section 120 is pulsed to an indexed location. Whenever the features 124 in the half-barrel section 120 and the complementary features 134 in the indexing units 130 are mated, the location of the half-barrel section 120 is indexed to a known location in a coordinate space shared by the track 110, the indexing units 130, and the frame installation station 140. Specifically, each indexing unit 130 is disposed at a known offset (O) (e.g., along three axes) from the frame installation station 140, meaning that the act of indexing a half-barrel section 120 to the indexing units 130 causes the position of the half-barrel section 120 relative to the frame installation station 140 to be known. When the complementary features 134 are mated to the indexing features, a 3D characterization of the IML, and/or OML loft of the portion of the half-barrel section within the purview of a station 140, as well as which operation is to be performed by the frame installation station 140, are known. In one embodiment, this knowledge comes from retrieving prior scans of the half-barrel section (or portion thereof), and aligning the scans with position information acquired from the indexing unit 130. In a further embodiment, this knowledge is acquired by reading a Radio Frequency Identifier (RFID) chip embedded in the half-barrel section proximate to the indexing unit 130. The indexing units 130 may also be disposed at specific indexing stations.

In one embodiment, indexing is performed at least according to the following description. A structure in the form of a half-barrel section is carried upon a track comprising a rail system coupled to the floor. The rails are positioned in known locations. The barrel section has been fabricated on a layup mandrel according to precise dimensions, and this precise layup enables indexing features to be precisely located in a manufacturing excess of the barrel section. Thus, once the half-barrel section is located on the precisely located rails (and possibly an additional Inner Mold Line (IML) or Outer Mold Line (OML) forcing tooling disposed upstream or downstream of the station), the 3D position and rotation of the barrel section is precisely known when the indexing feature is engaged, without the need for a full scan via probes or optical technology at each station.

The relative stiffness of the de-molded or otherwise formed barrel section can be relied upon to help the half-barrel section maintain a desired loft/IML/OML along with the precisely located railing and without the need for any substantial shape defining tooling during pulsed assembly. In this arrangement, the features are located precisely into the barrel section relative to the loft/IML/OML of the structure and the precisely located rails help convey the half-barrel section from station to station without distortion. Therefore, a 3D position and orientation of the barrel section (e.g., including loft/IML/OML) is quickly and precisely characterized (i.e., indexed) after each pulse (or continuous movement) without the need to re-scan the barrel section each time. To reiterate, the indexing process conveys a 3D characterization of the IML and/or OML loft of the portion of the half-barrel section within the purview of a particular station, as well as which operation is to be performed by the station. In some embodiments, this indexing indicates that no operation will be performed at the station for this portion of the half-barrel section.

Because of the precise indexing performed, the frame installation stations 140 are able to know exactly where they are relative to the half-barrel section 120 when the half-barrel section 120 is locked into place at the frame installation station 140 by an indexing unit 130, as well as which operation is to be performed by the frame installation station (e.g., by referencing to an RFID determined during the indexing). It is possible that no operation would be performed at a particular station, which enables maintenance to be performed at the station. The 3D position and orientation, and/or the loft/IML/OML of the half-barrel section is then established or indexed into any Numerical Control (NC) programming or automated system in use at the station. Therefore, no setup time or scanning is needed after each pulse (or continuous movement) of the half-barrel section 120. Furthermore, structure added to or removed from the half-barrel section 120 in the prior station may be added to whatever half-barrel section model or representation is within the system 100, without the need to scan the half-barrel section for the changes.

The indexing of the half-barrel section 120 of the fuselage may be performed by aligning the half-barrel section 120 to the indexing unit 130. The frame installation station 140 has a known relationship with the indexing unit 130, so this also indexes the half-barrel section 120 to the frame installation station 140. When the half-barrel section 120 and the frame installation station 140 are in a known relationship, the frames 142 loaded by the frame installation station 140 are inherently indexed to the half-barrel section 120, because the frame 142 itself is already at a known relationship to the frame installation station 140. Thus, indexing an arcuate section of fuselage, such as the half-barrel section 120, may include mating a feature 124 located on the half-barrel section 120 with a complementary feature 134 at an indexing unit 130 having a known physical offset from the frame installation station 140, such that the mating instantly results in the half-barrel section 120 having a known location relative to the frame installation station 140. This is because the complementary features 134 at the indexing unit 130 are pre-located and sized to fit while the half-barrel section 120 is at a specific and precisely determined location.

Frame installation station 140 includes a loader 150, which feeds frames 142 from a position outside of the concavity 126 into the concavity 126 for alignment. The frames 142 are provided via a feeder line 191 that fabricates and supplies the frames Just in Time (JIT) to the frame installation station 140, in a desired order and orientation for installation. Thus, the arrival of the frame JIT to the frame installation station 140 comprises the last portion of a feeder line for frames.

The loader 150 comprises a powered or gravity-loaded device for feeding frames 142. In one embodiment, feeding a frame 142 comprises feeding the frame 142 longitudinally under an arcuate section of fuselage. Frame installation station 140 further comprises an alignment tool 160 disposed within the concavity 126 of the half-barrel section 120. The alignment tool 160 is configured to align the frames 142 into position along IML 128 of the half-barrel section 120. In one embodiment, the frames 142 are fed under the bearing edge 113 of the half-barrel section 120 at an arcuate orientation that matches the arcuate IML of the half-barrel section 120. This enables placement of the frame 142 against the IML without the need to re-orientate the frame. Alignment tool 160 may comprise a robot arm, a zero-gravity arm, an actuated device, or other machine. A fastening machine 144 (e.g., an end effector, drilling machine, automated lock bolt installation machine, etc.) installs the frames 142 by temporarily fastening the frames 142 into place or otherwise attaching the frames 142, and then installing fasteners 146 that permanently affix the frames 142 in place along the circumferential arc of the half-barrel section 120, or any arc formed by the frames 142. It should be appreciated that the frames 142 are not required to be formed in a 180° arc to directly match the circumferential arc of the half-barrel section 120, but rather, can be formed in smaller arcs, such as 60 or 90° arcs, which can be spliced together to match the larger circumferential portions of the half-barrel section 120. A frame splicing station 190 or apparatus for splicing the frames together is described in greater detail below.

It should be appreciated that more than one fastening machine 144 could be used on the frame installation station 140. Multiple fastening machines 144 having a limited stroke can work in parallel with workers in close proximity to the fastening machines 144 while the in-line assembly system 100 pulses, or continuously feeds, the half-barrel section 120 along the track 110. The work of the machines and workers can thus be synchronized while the workers stand within the concavity 126 of the half-barrel section 120.

Figure 5:
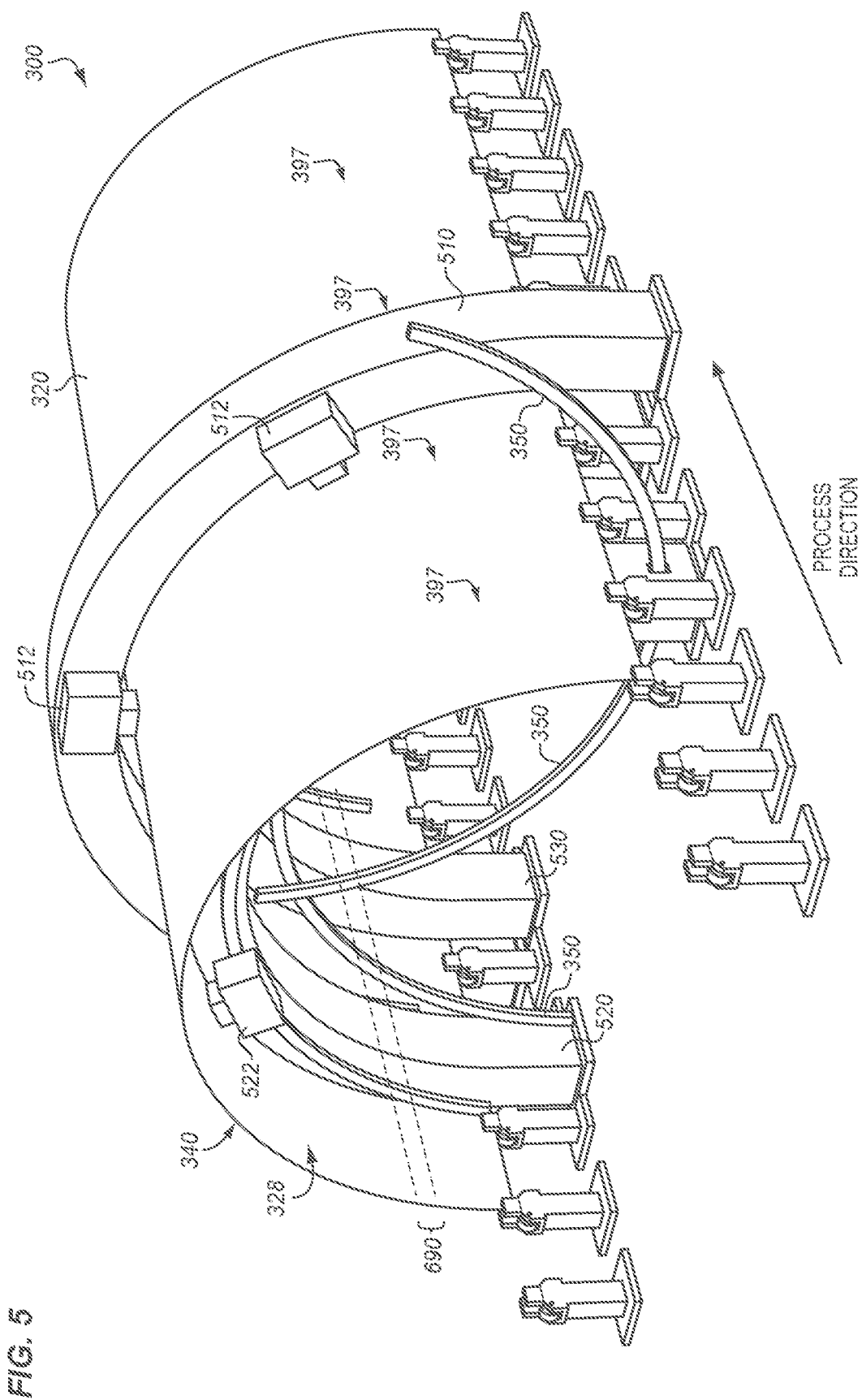
FIG. 5 is a further perspective view of frames being fed underneath a half-barrel section of fuselage before installation in an illustrative embodiment.

In one embodiment, frame installation station 140 comprises one of multiple stations that are disposed along the track 110 and are separated by less than the length of the half-barrel section 120, such as a "frame pitch", which can, for example, be equal to the distance between frames. FIG. 5 shows several frame pitch locations 397 which extend along the length of the arcuate section 320. Work (also referred to as "processing") performed by other stations may comprise installing new parts onto the half-barrel section 120 via fasteners, removing material (e.g., drilling or trimming), adding material, etc. In one embodiment, each of the stations performs a type of work such as, for example and not necessarily limited to, installing frames, installing door surrounds, installing window surrounds, installing intercostals, cutting door holes, non-destructive inspection (NDI), sealing and/or cutting window holes. In another embodiment, it might be desirable to install structures such as frames, door surrounds and window frames to the half-barrel prior to making the big cut-outs. This would allow the structure (skin of the half-barrel) to be as stiff as possible during the holding/indexing/transferring for better/more accurate indexing of processes and/or parts. As a part of the installation process, these various components being installed may be located and indexed with respect to the half-barrel section 120. For example, cup-and-cone indexing systems may be utilized to place a part onto a half-barrel section, and hard-stop indexing may be utilized to index a half-barrel section 120 to a further work station.

In this embodiment, a frame splicing station 190 is also depicted. The frame splicing station 190 splices adjacent frames together to form integrated frames that occupy larger circumferential portions of the half-barrel section 120. For example, in embodiments where the frames 142 form ninety degree arcs, the frame splicing station 190 performs a single splice to combine two of the frames 142 into a one hundred and eighty degree frame. In embodiments where the frames form sixty degree arcs, the frame splicing station 190 performs two splices to combine three frames at the same location along the length of the fuselage into a one hundred and eighty degree frame. In one embodiment, the frame splicing station 190 applies fasteners and a splice plate that overlaps two frames being spliced, in order to structurally unite the frames. The splicing can be performed at a web of the flanges, and/or across one or more flanges, of the frames.

The operations of the frame installation station 140 and/or other stations are managed by controller 112. In one embodiment, controller 112 determines a progress of the half-barrel section 120 along the track 110 (e.g., based on input from a technician, in accordance with an automated process such as input from a camera or physical sensor, such as a linear or rotary actuator), and uses this input to manage the operations of the frame installation station 140 in accordance with instructions stored in a Numerical Control (NC) program. Controller 112 may be implemented, for example, as custom circuitry, as a hardware processor executing sequenced standard work single function programmed instructions, or some combination thereof.

In further embodiments, systems and stations similar to that depicted in FIG. 1 are used for window or door surround installation. In such embodiments, surround components entering the work station at the end of a feeder line are aligned for IML installation, OML installation, and/or through the half-barrel section skin. Fasteners and similar components are fed JIT into the station(s) at the end of a feeder line in a manner similar to the feeder line used for frames in FIG. 1.

In all stations there will multiple work zones within the station and adjacent such that significant parallel processing can be performed by either a person, piece of equipment, and/or both in close proximity of each other. This is what drives single purpose, simple, pieces of equipment with limited function and machine motion. It is a safety design issue for the operators and it is a productivity, maintainable modular design concept unique to aerospace applications. Traditional aerospace processing which use large complex single process cells with complex end deflectors and larger motion envelopes usually results in poor work and process packing densities.

Illustrative details of the operation of line assembly system 100 will be discussed with regard to FIG. 2. Assume, for this embodiment, that one or more of the half-barrel sections 120 have been placed in sequence onto the track 110, and are ready to receive frames for installation.

The gap between adjacent half-barrel sections in line is an operational management lever that be used to increase Available Time per Month (ATV) and Support Line Move Reliability requirements. There are new operational management and maintenance strategies which can be pursued as a result of this continuous flow line design.

Figure 2:
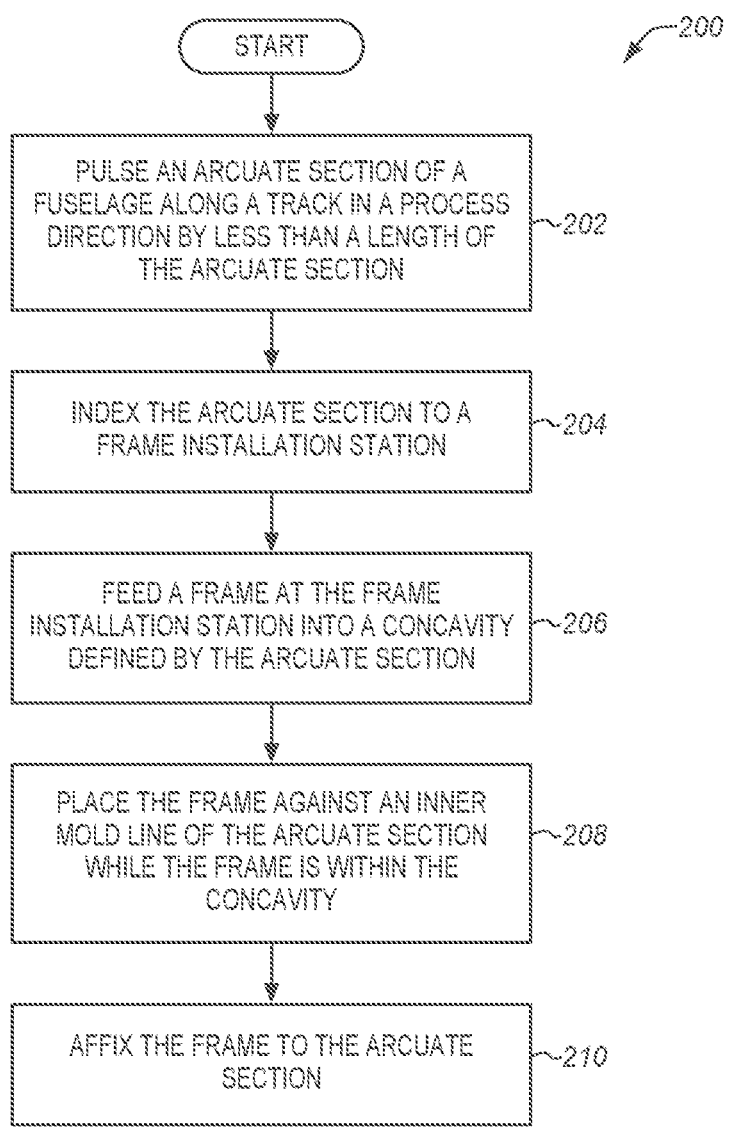
FIG. 2 is a flowchart illustrating a method for operating a line assembly system to install frames in an illustrative embodiment.

FIG. 2 is a flowchart illustrating a method 200 for operating a line assembly system to install frames in an illustrative embodiment. The steps of method 200 are described with reference to line assembly system 100 of FIG. 1, but those skilled in the art will appreciate that method 200 may be performed in other systems. The steps of the flowcharts described herein are not all inclusive and may include other steps not shown. The steps described herein may also be performed in an alternative order. Furthermore, although the steps herein are described for half-barrel sections, they may be applied to any suitable arcuate sections of fuselage, such as full barrel sections, one-quarter barrel sections, or other segment sizes.

In general the work is broken into products lengths and process operations are that are 5-10% of product lengths, this is true for a pulsed and a continuously moving line assembly system 100. In case of a continuously moving line, it is the length product moves during an equivalent pulse time. In step 202, an arcuate section of a fuselage is pulsed along a track 110 in a process direction 181 by less than a length of the arcuate section. In step 202, half-barrel section 120 is pulsed along the track 110 in a process direction 181 (e.g., along the length of the track 110) by less than a length of the half-barrel section 120, or even its entire length. Pulsing the half-barrel section 120 incrementally exposes new portions of the half-barrel section 120 for receiving work from the frame installation station 140. The distance traveled in a pulse may equal, for example, a distance between frame locations at the half-barrel section 120 (i.e., a frame pitch). Other pulse lengths are, of course, also possible. In embodiments where the track 110 is powered, this comprises driving one or more elements of the track to move the half-barrel section in the process direction 181. Generally, redundant drives could be placed along the length of the track 110 which will be integrated in overall indexing and movement system. In further embodiments, this comprises operating an Autonomous Guided Vehicle (AGV), or operating a powered cart mounted to the track 110 in order to pulse the half-barrel section 120 to a desired location along the track 110. In embodiments where additional sections of fuselage are disposed on the track 110, the additional sections are also pulsed or continuously moved by less than the length of the half-barrel section 120, in synchronization with the pulsing of the half-barrel section 120 depicted in FIG. 1.

In step 204, the arcuate section is indexed to a frame installation station. In step 204, the half-barrel section 120 is indexed to the track 110. In one embodiment, this comprises mating the features 124 in the half-barrel section 120 to complementary features 134 that are fixed relative to the track 110 at known offsets from the frame installation station 140 at the track 110. For example, pins disposed at the track 110 may be inserted into holes that have been machined into the half-barrel section 120 at predefined intervals. In further embodiments, any suitable indexing techniques and systems may be utilized to arrange the half-barrel section 120 in a desired relationship with a frame installation station 140. After the half-barrel section 120 has been indexed, the location of the half-barrel section 120 relative to the frame installation station 140 is known (i.e., because the offsets from the indexing units 130 to the frame installation station 140 is known). Hence, work can be performed at a desired level of accuracy (e.g., to within fractions of an inch) even for very large structures. In embodiments where multiple sections of fuselage travel along the track 110 at once, the indexing of the half-barrel sections 120 may be performed in synchronization.

The indexing of the frame 142 in step 204 will likely be comprised of hard tooling surface datums both in hoop and forward/aft. It is comprised of common datums planes for multiple sections. This means that one simple fixture in the frame installation station 140 for frame indexing in line can locate all frames 142 in section within the line. This structure may offer fabrication simplification and may result in significant reductions of tooling and cost. In traditional aerospace fixed cells manufacturing systems, generally, a larger tool comprised of a fixture for every frame is required, or 2) recurring tooling and capital cost can be incurred due to the need to put in hole datuming features to locate frames 142 relative to half-barrel section 120. This simple standard work datum and indexing utilized herein may help to reduce non-recurring and recurring costs both for suppliers who fabricate the frames 142 or other parts as well as for the line operator and supplier of fabricated skin/stringer half-barrel section 120.

Figure 3:
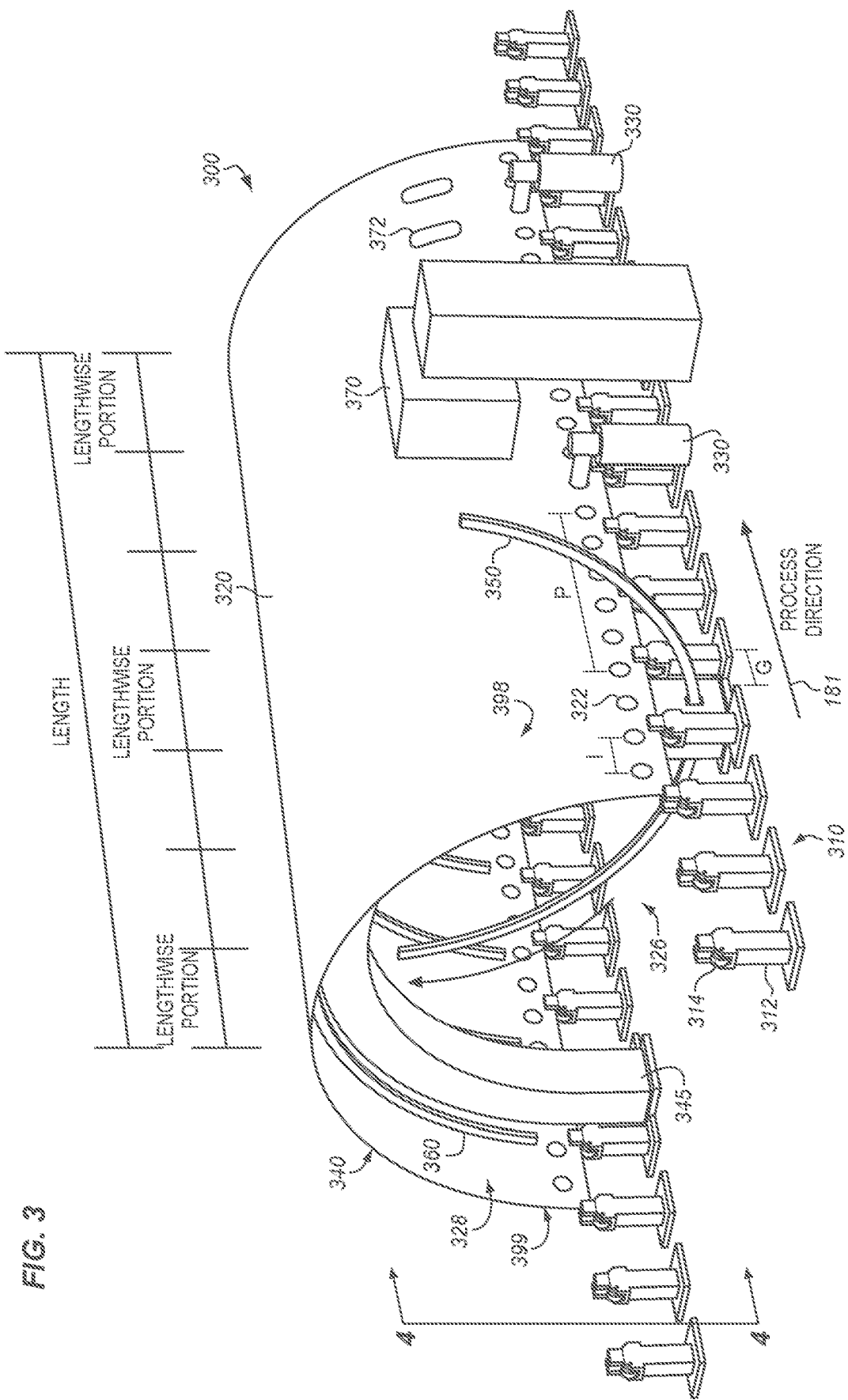
FIG. 3 is a perspective view of frames being fed underneath a half-barrel section of fuselage before installation in an illustrative embodiment.

In step 206, a frame is fed at the frame installation station into a concavity defined by the arcuate section. In step 206, loader 150 feeds a frame 142 at the frame installation station 140 into a concavity 126 defined by the half-barrel section 120. In embodiments where the half-barrel section 120 travels on an elevated rail, this comprises the loader 150 feeding the frame underneath the edges of the half-barrel section 120 that contact the track 110, and/or underneath the track 110 (e.g., underneath an edge thereof). For example, this may include advancing the frame through a feeder nip under the arcuate section. Because frames 142 are curved to match the contour of the IML 128, the frames 142 exhibit contours (e.g., radii that match a desired IML of the half-barrel section 120) that are many feet long, even though the frames themselves have cross-sections only a few inches wide. To enable loading for frames of these sizes, in one embodiment the loader 150 rotates the frames 142 while feeding the frames, such that the frames curve underneath the longitudinal edge of half-barrel section 120 while they are being fed (as shown in FIGS. 3-5).

In step 208, the frame is placed against an inner mold line of the arcuate section while the frame is within the concavity. In step 208, alignment tool 160 places the frame 142 against an IML 128 of the half-barrel section 120 while the frame 142 is within the concavity, based on the indexing in step 202. In one embodiment, this comprises alignment tool 160 lifting, rotating, and pressing the frame 142 against the IML 128 via a zero-gravity arm or robot arm, or even via manual processes. That is, the frame 142 is clamped to a skin forming the half-barrel section 120 while the frame 142 is aligned. The placement is based on the indexing in step 202, in that the indexing conveys a characterization of position of the half-barrel section 120 along the track 110, and depending on embodiment can further indicate characteristics of a loft, and/or an IML 128 of the half-barrel section 120.

In step 210, the frame is affixed to the arcuate section. In step 210, the fastening machine 144 affixes the frame 142 to the half-barrel section 120. In one method, affixing the frame is performed during a pause between pulses (e.g., by a frame pitch) of the arcuate section in a process direction 181. In one embodiment, the frames 142 are positioned along the IML 128 by feeding the frames 142 under a bearing edge 113 of the half-barrel section 120 at an orientation that matches the IML 128 of the half-barrel section 120. The method further includes coupling the frame 142 with the alignment tool 160 to facilitate placement of the frame against the IML. In one embodiment, this step comprises the fastening machine 144 clamping the frame 142 to the IML 128, drilling holes through the IML 128 and the frame 142, and installing fasteners. Steps 206-210 may be repeated as desired until all frames have been installed along a portion of the length of the half-barrel section 120. Operations may then proceed to steps 202 and 204, after which steps 206-210 are again repeated. These operations may continue until the half-barrel section 120 has received frames along its length (e.g., after having moved a distance at least equal to its length).

Method 200 provides a technical benefit over prior techniques, because it enables line-based assembly techniques to be implemented upon large structures such as aircraft fuselages. Because this technique moves the large structures in small increments (e.g., two to eight feet, a frame pitch (i.e., a distance between frame installation stations), etc.), it also reduces the amount of work to be completed in each interval of work, which reduces both the risk of a delay and the potential length of such a delay.

FIG. 3 is a perspective view of frames 350 being fed underneath a longitudinal edge of a half-barrel section 320 of fuselage before installation in an illustrative embodiment. Although not shown, stringers and/or intercostals may be installed onto all or part of the half-barrel section 320 in certain embodiments where the stringers are not co-cured to the half-barrel section.

Half-barrel section 320 defines a concavity 326, and has an IML 328, and is moved along rollers 314 of posts 312 at a track 310. Half-barrel section 320 also includes indexing features 322, also referred to herein as machined features 322, on either of its sides, in the form of holes that are indexed to indexing units 330. Other types of features are also possible. In between sessions of work, the half-barrel section 320 moves along the track 310 to expose new lengthwise portions to one or more stations. During each pulse, the half-barrel sections 320 proceed by a distance P (which is less than a length of a half-barrel section, and may equal the length of a lengthwise portion thereof). Machined features 322 within the half-barrel sections 320 are separated by an interval I, which is less than P. However, in further embodiments, machined features 322 are separated by more than P. Furthermore, while the machined features 322 are illustrated as being linearly aligned and similarly shaped, in further embodiments the machined features 322 need not be so. After the end of each pulse, the machined features 322 are mated to an indexing unit 330, and frames are installed.

In this embodiment, frame installation station 340 comprises a fixed, arcuate half ring structure 345 (or a half-ring that is mobile relative to the station 340), to which the half-barrel section 320 section travels over during a pulse. The frame installation station 340 installs frames at a lengthwise portion of the half-barrel section within a purview of the frame installation station at the track. Movement of the half-barrel section 320 exposes new lengthwise portions of the Inner Mold Line (IML) of the fuselage to machines disposed along the fixed half-ring structure 345. After the half-barrel section 320 is paused, it is then clamped up for frame installation. In one embodiment, a physical fit formed between the indexing units 330 at track 310 and the half-barrel section 320 causes the half-barrel section 320 to resist applied forces. This enables the frame installation station 340 to perform One-Up Assembly (OUA) processes wherein a single alignment machine 420 presses against the half-barrel section 320. That is, forces applied by the alignment machine 420 are transferred to the indexing units by the physical fit/coupling between the half-barrel section 320 and the indexing units. Because the indexing units are fixed relative to the fixed half ring structure 345, the forces are borne without the half-barrel section 320 being moved. This enables a desired level of clamping force between the half-barrel section 320 and the machine as the machine performs work. Furthermore, clamping loads from One up Assembly (OUA) operations can be transferred through IML or OML reinforcing structure (e.g., via fixed half ring structure 345) as desired. During operation, frames 350 are loaded underneath the half-barrel section 320 and through gap G into the concavity 326, before they are aligned with frame installation locations 360 and installed.

Downstream of frame installation station 340, additional stations may perform work on the half-barrel section 320, for example by installing surrounds for doors and windows, or cutting out doors and windows. These stations may even be located only a frame pitch away from the frame installation station 340, or a different distance.

Furthermore, in some embodiments window cutouts are performed downstream in the same half-barrel section after or during frame installation, such as by a cut-out station 370 disposed downstream of the frame installation station 340. The cut-out station 370 cuts out windows 372 or doors at predefined locations, and may operate during the same pause as the frame installation station 340. Thus, the arrangement of stations in FIG. 3 enables multiple stations to work on different portions of the half-barrel section 120 within their station purview during the same pause (the same time interval whether the in-line assembly system 100 is being pulsed or is in a continuous line flow.

In one embodiment, the cut-out station 370, which is disposed downstream of the frame installation station, cuts out material from a lengthwise portion that previously received a frame from the frame installation station 340 after the half-barrel section 320 of fuselage advances past the frame installation station 340, and the lengthwise portion comes within a purview of the cut-out station. In a further embodiment, the cut-out station 370 cuts out material from a second lengthwise portion while the frame installation station 340 installs frames at a first lengthwise portion.

Using the techniques recited above, multiple operations can be performed at one pulsed half-barrel section that is pulsed at a pitch of one frame (or any pitch less than an entire half of the half-barrel fuselage section length). In further embodiments operations of Non-Destructive Imaging (NDI) frame installation, window surround installation, cutout, and final trim, and edge sealing can be performed during the same pause on the same half-barrel section in serial.

The use of multi-stations and a multi-process line has advantages in that parts, standards, consumables, tools, etc. used in the work stations are commensurable. Waste product from previous number of pulse lengths can be more easily handled and removed from the system 100. Productivity, thus, may increase as a result of integrating incoming and outgoing flow of materials with an integrated system possibly resulting in lower recurring cost per unit along with reduced asset cost to produce a given number of units per month. The integrated logistics in-line assembly system may thus enable the line to function efficiently since work processes are synchronized into a standard work bit which is repeated over and over again.

Figure 4A:
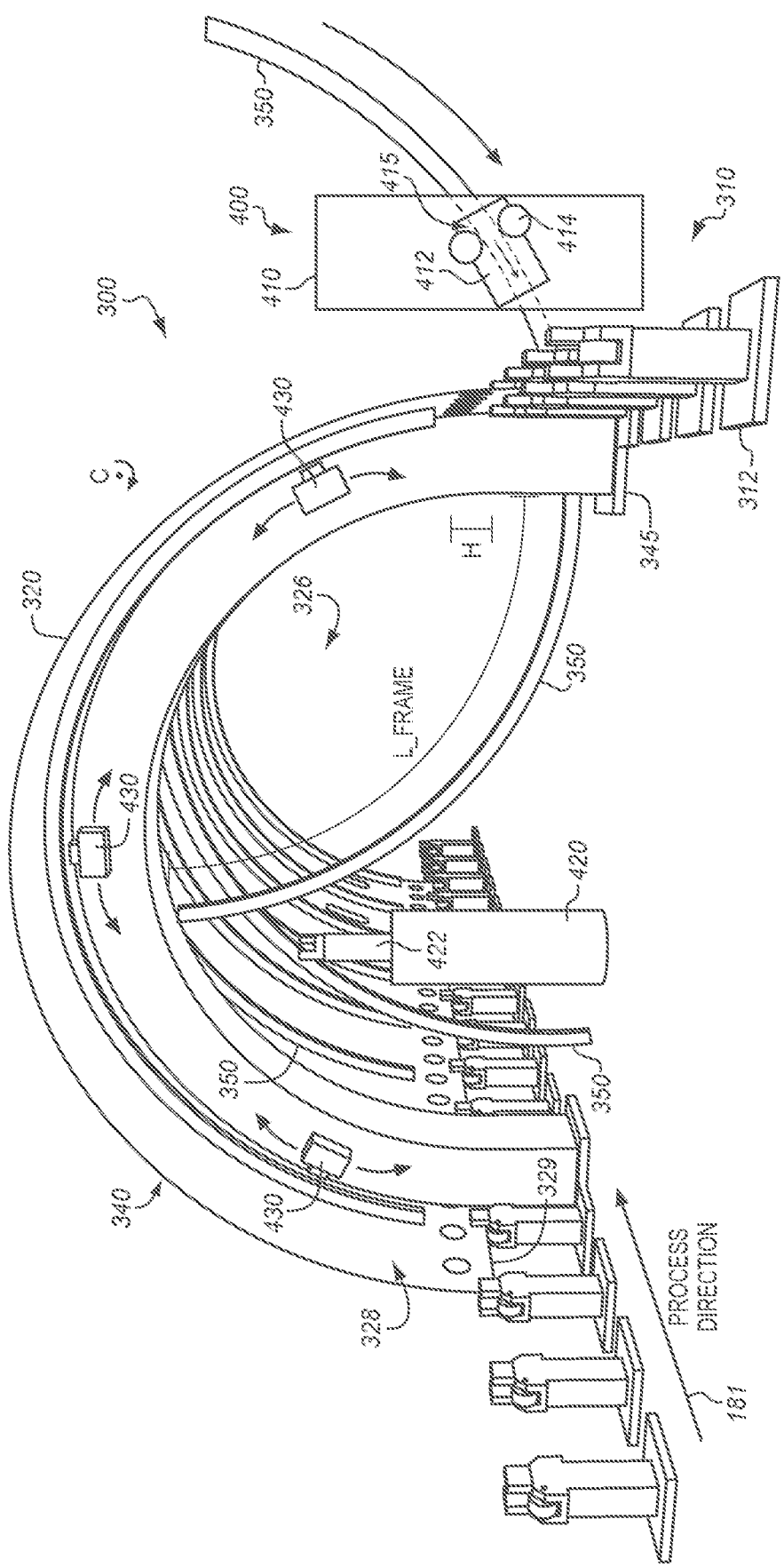
FIG. 4A is a side view of frames being fed underneath a half-barrel section of fuselage before installation in an illustrative embodiment.

FIG. 4A is a side view of frames 350 being fed underneath a half-barrel section of fuselage before installation in an illustrative embodiment, and corresponds with view arrows 4 of FIG. 3. While each frame is shown here as having a longitudinal length L and occupying a 180 degree arc of the IML in further embodiments frames may occupy any suitable arc and may then be spliced together into full hoops.

In one embodiment, the frames 350 do not extend into the manufacturing excess to the extent that they will reach the bearing edge 329. That is, a gap of a height H exists between the bottom of the frames 350 and the bearing edge 329. This arrangement provides additional clearance which facilitates movement along the track 310 and later installation of a splice plate between half-barrel sections of fuselage. The frames 350 can later be joined via stub frames (not shown) or other components. In one embodiment, the frames 350 remain recessed into an arcuate periphery of the half-barrel section of fuselage that they are installed into, and occupy less than one hundred and eighty degrees of circumference. In yet another embodiment, frames 350 are installed in full length, and then cut to a desired length after installation to accommodate splice plate installation or other operations.

The longitudinal length of the frame 350 during installation is rotated ninety degrees from the length of the half-barrel section 320 during installation. FIG. 4A further depicts an apparatus 400 in the form of a loader 410 which includes a motor 412. Motor 412 drives pinch rollers 414 that form a feeder nip 415 to move a frame 350 underneath the half-barrel section 320 and into the concavity 326 while also rotating the frame 350 about a center point C. Specifically, the frame 350 is forced under the longitudinal edge 329 of the barrel section 320 by the feeder nip 415 created by powered pinch rollers 414. The frames 350 are orientated for placement within half-barrel section 320.

Stated succinctly, the loader 410 includes pinch rollers 414 disposed underneath/at a bearing edge 329 of an arcuate section (e.g., half-barrel section 320) of fuselage that is supported by rollers 314 attached to posts 312 (e.g., stanchions). In further embodiments, the pinch rollers 414 are attached to the bearing edge 329 of the section of fuselage, and roll along a continuous track that is mounted to the posts 312, resulting in "roller skates" at the arcuate section (e.g., half-barrel section 320). The arcuate section includes a concavity 326 that faces downwards. A motor 412 drives the pinch rollers 414 to advance a frame 350 beneath the bearing edge 329 and into the concavity 326, via a gap (gap G, of FIG. 3) between the stanchions (e.g., posts 312). The pinch rollers 414 form the feeder nip 415 for driving the frames 350 into the concavity 326 of the half-barrel section 320. The pinch rollers 414 drive the frames 350 in a direction perpendicular to a process direction 181 of the arcuate section (e.g., half-barrel section 320) of fuselage, and the pinch rollers 414 feed the frames 350 to an alignment machine 420 of a frame installation station 340.

Frames 350 that have entered the concavity 326 are acquired by alignment machine 420, which operates actuator 422 to drive the frames into place. In further embodiments, a loader 410 is disposed on either side of the half-barrel section 320, and each loader rotates and moves a frame into the concavity 326. However, in further embodiments the alignment is manually performed. In such an embodiment, a loader on the left side 399 of the half-barrel section 320 provides frames for installation on the right side, and a loader 410 on the right side 398 of the half-barrel section 320 provides frames for installation on the left side 399. In a further embodiment, temporary fasteners are utilized to hold frames in place and facilitate "drill and fill" installation. Fastening machine 430 installs the frames 350, for example by clamping frames to the IML 328, by drilling, and by installing fasteners 146. In further embodiments, frames 350 for one frame installation station 340 may be installed on a left side, while frames 350 for another frame installation station (e.g., a downstream of upstream station) may be installed on a right side, and spliced to the left side frames. Such techniques can be utilized to splice frames occupying less than a one hundred and eighty degree arc, such as a ninety degree arc or sixty degree arc. A certain quantity of permanent fasteners with multiple synchronized pieces described above can fasten the frame 350 or frame sections to the half-barrel section 320 within the allocated pulse time or interval time for continuously moving line. If a continuous in-line assembly system is being utilized, then the various processing equipment and support tooling/equipment would have to move with the continuously moving half-barrel section. Once a frame 350 is fastened to the half-barrel section 320, the equipment would pulse back to a start installation point to do next frame installation or other process as described below.

FIGS. 4B-4E show a mechanism and a processing sequence which allow the frame installation station 340 to be used as a continuously moving in-line assembly system. In this embodiment, the half-barrel section 320 is continuously moved, rather than being pulsed, from one installation position to another.

Figure 4B:
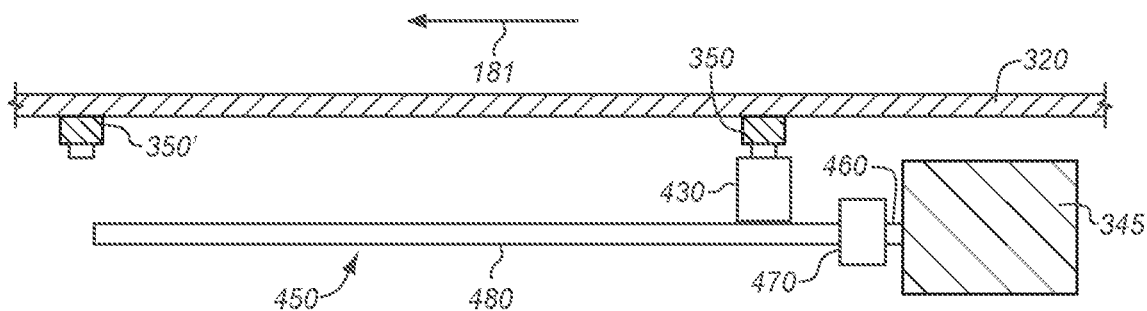
FIG. 4B is a schematic view of the fastening machine which installs the frames, for example, by clamping frames to the half-barrel section, by drilling, and by installing fasteners, as the fastening machine is shown in a first installation position.

In this embodiment, each fastening machine 430 would be movably mounted to the arcuate half-ring structure 345 of the frame installation station 340 to allow each machine 430 to move along an arc of the half-ring structure 345. This frame installation system 340 includes a linear-motion actuator 450 which allows each machine 430 to move in a linear, process direction simultaneously with the half-barrel section 320. In FIG. 4B, the process direction is shown by arrow 181. The linear motion actuator 450 includes a track 480 upon which the machine 430 is movably mounted and which supports the machine 430 as it moves in the process direction 181. A drive unit 470 is coupled to the track 480 and provides actuation to moves the machine 430 in a linear fashion. This drive unit 470 also allows the linear-motion actuator 450 to move along a track 460 which is mounted to the half-ring structure 345. This track can be arcuate to match the arcuate half-ring structure 345 or can have different configurations depending on the manner in which the fastening machines 430 are to be moved along the half-ring structure 345. Additionally, it should be appreciated that the manner in which the track 460 is coupled to the half-ring structure 345 can be varied depending upon the structure of the frame installation station 340.

In FIG. 4B, the machine 430 is shown in a first installation position in which the fastening machine 430 initiates fixing the frame 350 to the half-barrel section 320. As can be seen in FIG. 4B, the machine 430 engages the frame 350 to start fastening the frame 350 to the half-barrel section 320. The fastening procedure could be accomplished, for example, by clamping the frame 350 to the IML 328 of the half-barrel section 320, by drilling, and by installing fasteners 146. The machine 430 moves with the half-barrel section 320 in the process direction along track 460 to complete installation of the fastener at this first fastening position on the frame 350. As can be seen in FIG. 4B, a frame 350' which has just be fastened to the half-barrel section 320 is shown leaving the area in which the fastening process takes place.

Figure 4C:
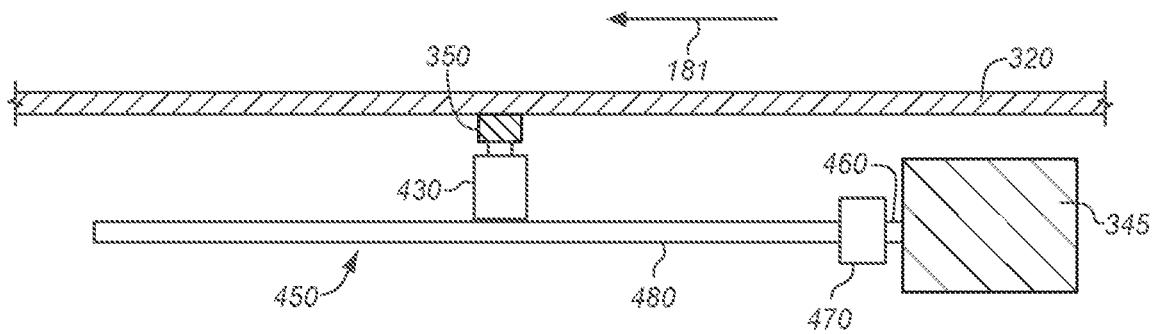
FIG. 4C is a schematic view of the fastening machine of FIG. 4B showing the fastening machine as it moves with a half-barrel section to a second installation position as the half-barrel section and the fastening machine move in a continuous, rather than pulsed, fashion.

FIG. 4C shows the movement of the fastening machine 430 from the initial, first installation position to a second installation position. Here, the fastening machine 430 again simultaneously moves with the half-barrel section 320. Also, the fastening machine 430 has moved along the arc of the frame 350 to a new location at which a new fastener 146 will be installed. The drive unit 470 moves the fastening machine 430 and the linear-motion actuator 450 simultaneously to this new installation position along the arcuate length of the frame 350.

Figure 4D:
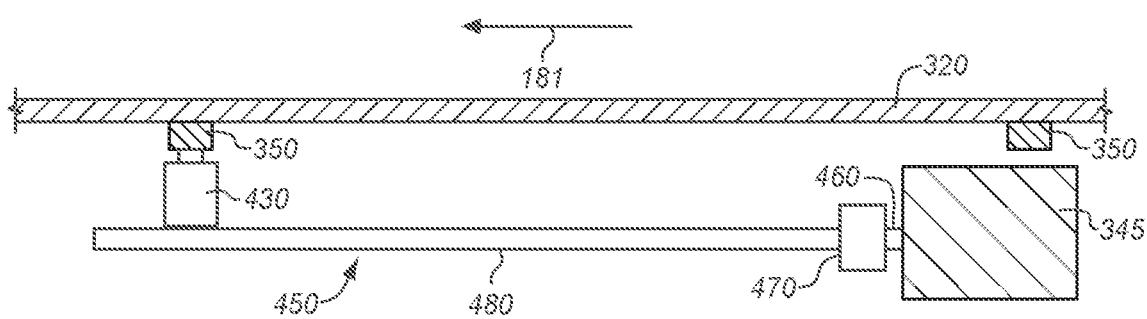
FIG. 4D is a schematic view of the fastening machine of FIGS. 4B and 4C as the fastening machine and half-barrel section move to a third installation position.

FIG. 4D shows further movement of the fastening machine 430 to a third installation position. Here, the fastening machine 430 is again simultaneously moving with the half-barrel section 320. Also, the fastening machine 430 has again moved along the arc of the frame 350 to a new installation location at which a new fastener 146 will be installed. The drive unit 470 moves the fastening machine 430 and the linear-motion actuator 450 simultaneously to this new installation position along the arcuate length of the frame 350. While the disclosed embodiment utilizes three installation positions, it should be appreciated that more of less installation positions could be implemented in the fastening process. As can be see in FIG. 4D, as the fastening machine 430 is at its extended position, a new frame 350 is being moved into the initial start position via the movement of the half-barrel section 320.

Figure 4E:
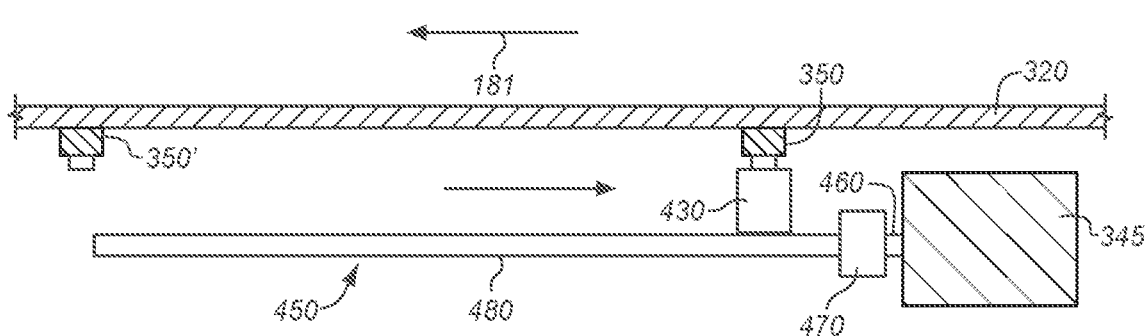
FIG. 4E is a schematic view of the fastening machine after it has transitioned back to the start position to install a new frame to the half-barrel section.

In FIG. 4E, the fastening machine 430 has moved back to the initial first installation position where it will initially engage the new frame 350. The same sequence of installing the fasteners at various installation positions along the frame 350 and half-barrel section 320 repeats.

It should be appreciated that the linear-motion actuator 450 disclosed above is just one mechanism which can be implemented to move the fastening machines 430 with the half-barrel section 320 in a continuous motion in-line assembly system. Additionally, other equipment (such as the alignment machine 420 of the system 300) may be required to move along with the half-barrel section. Such equipment could be coupled to an actuation apparatus as well to allow the piece of equipment to move from an initial processing position through a work stroke and then be returned to the initial processing position to repeatedly perform the particular work procedure.

FIG. 5 is a further perspective view of frames 350 being fed underneath a half-barrel section 320 of fuselage before installation in an illustrative embodiment. According to FIG. 5, fastening machines 512, 522 disposed along a combination of inner half-ring structure 530 and inner half-ring structure 520, and an outer half-ring 510, operate together to facilitate clamp-up and installation of frames 350. In this embodiment, OML fastening machines 512 are also visible, as is one of the set of IML fastening machines 522 that are movable mounted to the inner half-ring structure 520, 530. The IML and OML fastening machines 512, 522 operate in tandem to perform installation of the frames 350. The fastening machines 512, 522 may be mounted to a track or other mechanism which is capable of moving each fastening machine 512, 522 along a defined arc along either the inner half-ring structures 520, 530 and outer half-ring structure 510. It should be appreciated that more than one fastening machine 512, 522 could be associated with each half-ring structure 510, 520, 530. In further embodiments, more than one frame installation station could be used. For example, multiple stations may be utilized in series along the length of a half-barrel section 320 to install frames occupying a ninety degree arc. FIG. 5 further depicts frame pitch locations 397 along the length of the half-barrel section 320.

The system shown in FIG. 5 shows how modular equipment, such as the fastening machines 522, and the use of two inner half-ring structures 520, 530 could be used to maintain the flow of the in-line assembly system should one of the fastening machines 522 fail. For example, should the fastening machine 522 shown on the half-ring structure 520 fail, another fastening machine 522 (not shown) located on the second half-ring structure 530, could be programmed to perform the fastening process which would be usually performed by the failed fastening machine 522 located on half-ring structure 520. This feature allows the failed fastening machine 522 on half-ring structure 520 to be quickly replaced with another working unit without stopping or slowing down manufacturing.

Figure 6:
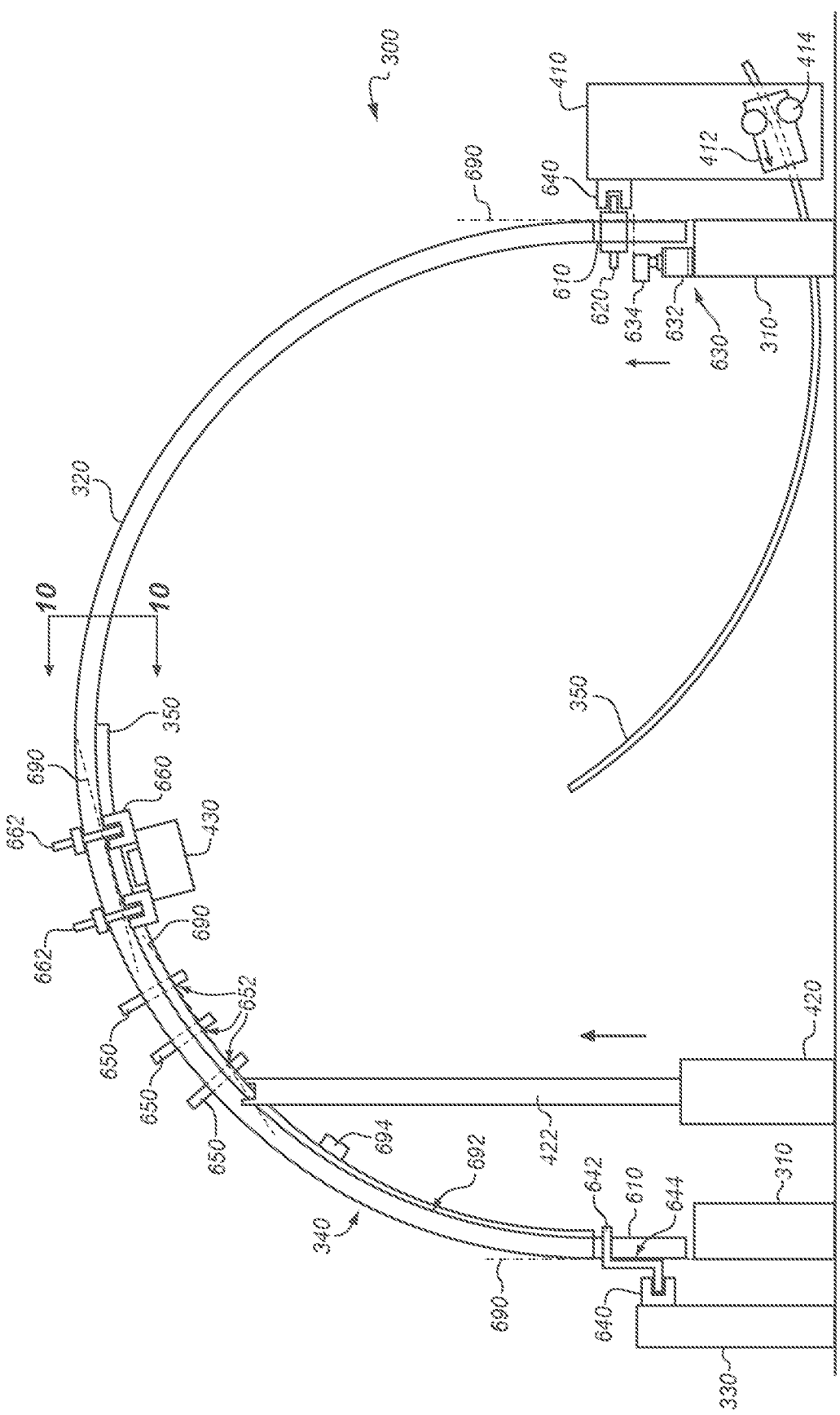
FIG. 6 is an end view of frames being fed underneath a half-barrel section of fuselage before installation in an illustrative embodiment.

FIG. 6 is an end view of frames 350 being fed underneath an arcuate section of fuselage (comprising a half-barrel section 320) before installation in an illustrative embodiment, and corresponds with view arrows 6 of FIG. 5. The frame installation station 340 is disposed at a track 310, and acquires a frame datum plane 690 (traveling into and out of the page) for use in aligning at least a portion of a web of a frame 350. In this embodiment, the frame datum plane 690 is roughly perpendicular to the view plane (i.e., to the face of the page). (e.g., via interaction with indexing features installed into a manufacturing excess 610 at the arcuate section, by mating to such indexing features). The half-barrel section 320 includes a frame land 692 onto which a frame 350 will be installed. The frame 350 will be installed along the length of the half-barrel section 320 at a frame pitch location 397. A hard stop 694 establishes a plane at the frame installation station 340 that aligns with a frame datum plane 690. The frame 350 is pushed against the frame land 692 and the hard stop 694 to ensure alignment, and the frame 350 is then clamped in place and installed. Frame datum planes 690 are established via three or more points along any of the surfaces discussed in FIG. 10 below.

In this embodiment, after the half-barrel section 320 of fuselage is pulsed/advanced in a process direction 181 into the page along the track 310, one or more indexing features (e.g., machined features 322) at the half-barrel section are engaged in contact with an indexing unit 330, which indexes the half-barrel section 320 to the frame installation station 340. Next, the frame datum plane 690 for the frame 350 is defined, by physically mating a portion of frame 350, loader 410, and/or fastening machine 430 to a surface defined by the indexing features. The indexing features may comprise pins or D/A holes, and the frame, loader, or machine may include pins that mate with at least three D/A holes (or one shapes defining a plane) to define the frame datum plane 690. For example, in an embodiment where the indexing features comprise pins, the frame 350 includes Determinant Assembly (D/A) holes that slot over the pins to acquire the datum plane. Thus, the locations of the pins and D/A holes may be reversed so that the frame 350 is located by the fastening machine 430 with reference to the frame datum plane 690. In further embodiments, D/A holes (are used to temporarily fasten a frame 350 into place prior to drill and fill installation.

The baseline approach would be to use surface datums located on the frames 350. Specifically, the surface datum can be formed by tooling or a machined datum surface used as part of the frame fabrication. In one particular embodiment of in-line assembly system, surface datum could be the flat web portion of frame 350 located to a fixed tool surface in a first frame installation station. If all fastening could not be completed by the first installation station, then the next frame installation station would not have a fixed tool to locate the frame. The next frame installation station would have additional fasteners to complete fastening of the frame to the half-barrel section. The other datum on the frame could be a trimmed edge on the frame which would be located by a tool surface on tool fixture and would be a starting point of longitudinally cutting manufacturing excess (section end of part) or offset from the half-barrel section. This approach standardized all frames for sections in line. It simplifies both fabrication of frames and fuselage skin stringer half-barrel section and is more easily automatable for location of frame to fixture rather than locating DA holes which were put in fuselage half-barrel section and frames.

As used herein, a frame datum plane 690 comprises a plane (e.g., established by lidar, visual inspection, physical contact, etc.) of the frame 350 or a surface along the IML of the half-barrel section 320 that is contacted by the frame 350 after the frame 350 has been attached. A frame datum plane 690 for the frame 350 is acquired via physical coupling between components of the frame installation station 340 and half-barrel section 320. In one embodiment, a frame datum plane 690 facilitating installation of the frame 350 is acquired by aligning one or more Determinant Assembly (D/A) holes 652 (or a surface) at the frame 350 with a corresponding pin 650 or surface of the half-barrel section 320. The frame datum plane 690 is therefore based off of one or more indexing features at the half-barrel section 320. In one embodiment, a surface of the frame, such as a web or flange of the frame, is held against a D/A hole or other feature in order to acquire a frame datum plane 690.

In one embodiment, machined features 322 are used to establish a frame datum plane 690 (e.g., based on lidar analysis) which is aligned with a web or a flange of a frame. In a further embodiment, a mechanical stop is used to establish the datum plane. That is, a frame web or flange can be butted up against the hard stop 694. In this embodiment, the frame datum plane 690 is made co-planar with the web or the flange of the frame, because the web or the flange falls within a single plane. This system enhances the ease of locating a frame relative to the fuselage. In such an arrangement, a half-barrel section of fuselage is pulsed, a feature is engaged, the frame passes under a bearing edge of the section of fuselage, and the frame datum plane 690 is located relative to the feature. In one embodiment, this occurs automatically when the feature is engaged at the station, as the frame datum plane 690 may or may not be a moving part. The coplanar portion of the frame 350 is placed against the frame datum plane 690, and then the frame fastened into place (e.g., by installing lockbolts or other components).

Any suitable combination of these techniques may be utilized in order to acquire a frame datum plane 690 for indexing the frame relative to the half-barrel section 320. Each frame installation station 340 may have some variance requiring slightly different frames or frame orientations. Therefore, there can be slight variations in the half-barrel section 320, the frame installation stations 340, and/or variances in frames to be installed or intercostals. This information can be conveyed via indexing features located in the manufacturing excess 129 of the half-barrel section 320. The frame installation station 340 is then alerted to variances at the beginning of a pause, which facilitates frame datum plane 690 acquisition discussed above.

Furthermore, this process, or similar ones, may also be utilized for other added structures, such as for window and door surrounds, clips, antennae, etc. These structures may also be passed underneath the fuselage section as desired, for installation against an IML of the fuselage section.

FIG. 6 also depicts further variations on this theme, wherein an indexing unit 330 includes a feature (e.g., a cup) that mates with a feature 642 (e.g., a frame landing feature in one embodiment, a pre-installed stringer in embodiments where the indexing unit 330 is disposed at an IML of the half-barrel section 320) having a backing 644 that defines a frame datum plane 690. Using the variations described herein, datum planes may be defined along an IML or OML of the half-barrel section 320. Furthermore, features on one or both sides are capable of being used to establish a relative position of a frame datum plane 690 to a feature, even when a feature is not within the frame datum plane. The feature may therefore be integral with, or intersect a parallel plane to the frame datum plane. Still further, FIG. 6 depicts a feature 640 placed onto a loader 410 for coupling with the pin 620 and defining a frame datum plane 690.

FIG. 6 also depicts a fastening machine 430 which includes features (e.g., cups 660) that mate with pins 662 to define a frame datum plane 690. The fastening machine 430 acquires the frame datum plane 690 by holding the frame 350 in contact with the indexing features, or by holding itself (e.g., cups 660) in contact with the indexing features.

As discussed above, the fastening machine 430 also attaches/affixes the frame to the arcuate section, based on the frame datum plane 690 (e.g., by placing a web or flange of the frame 350 into contact with the frame datum plane 690).

Still further, FIG. 6 depicts a braking machine 630 includes an actuator 632 that drives a pin stop 634 which halts the pin 620, and defines a frame datum plane 690 (e.g., along its front or back surface). The pin stop 634 receives the half-barrel section 320. The frame 350 is placed against the pin stop 634 to determine a frame datum plane 690, and the frame 350 is then indexed/located relative to the half-barrel section 320. Thus, the pin stop 634 is held in contact with one or more features at the half-barrel section 320 to acquire the frame datum plane 690. In further embodiments, a laser, ultrasonic sensor, etc. establishes the frame datum plane 690 for the frame 350. For example, in one embodiment this process comprises identifying a planar region via the techniques mentioned above, or detecting a constellation of features that define a planar region for use as a datum plane. Furthermore, D/A holes can be used to align with datum planes or flange edges or web faces as desired.

Various components of the frame installation station 340 may also be utilized in order to establish a datum plane. For example, the frame installation station 340 may include jigs and/or sensors for establishing datum planes, which are accurate when a half-barrel section of fuselage is engaged to a track at the end of each pulse. Such jigs may be arcuate structures that are complementary to a frame (e.g., the frame web or flange), or to surfaces that are complementary to the frame (e.g. along a span of the frame).

In further embodiments, a plane is established within the frame installation station 340. The plane coincides with the frame pitch location (397) on the half-barrel section. Next, the frame datum is matched to the plane to establish that the frame is aligned at the frame pitch location (397) relative to the half-barrel section. The frame is then installed onto the half-barrel section. Thus, the process involves aligning the frame datums to the plane located at the frame pitch location (397) of the half-barrel section. The plane is established relative to the frame pitch location (397) of the half-barrel section. This is how the frame is properly installed in the design location relative to the half-barrel section. The plane is used to ensure that the frame is aligned and located at the frame pitch location (397) relative to the half-barrel section. The frame pitch location (397), and plane within the frame installation station 340 align the frame to the frame pitch.

Figure 7:
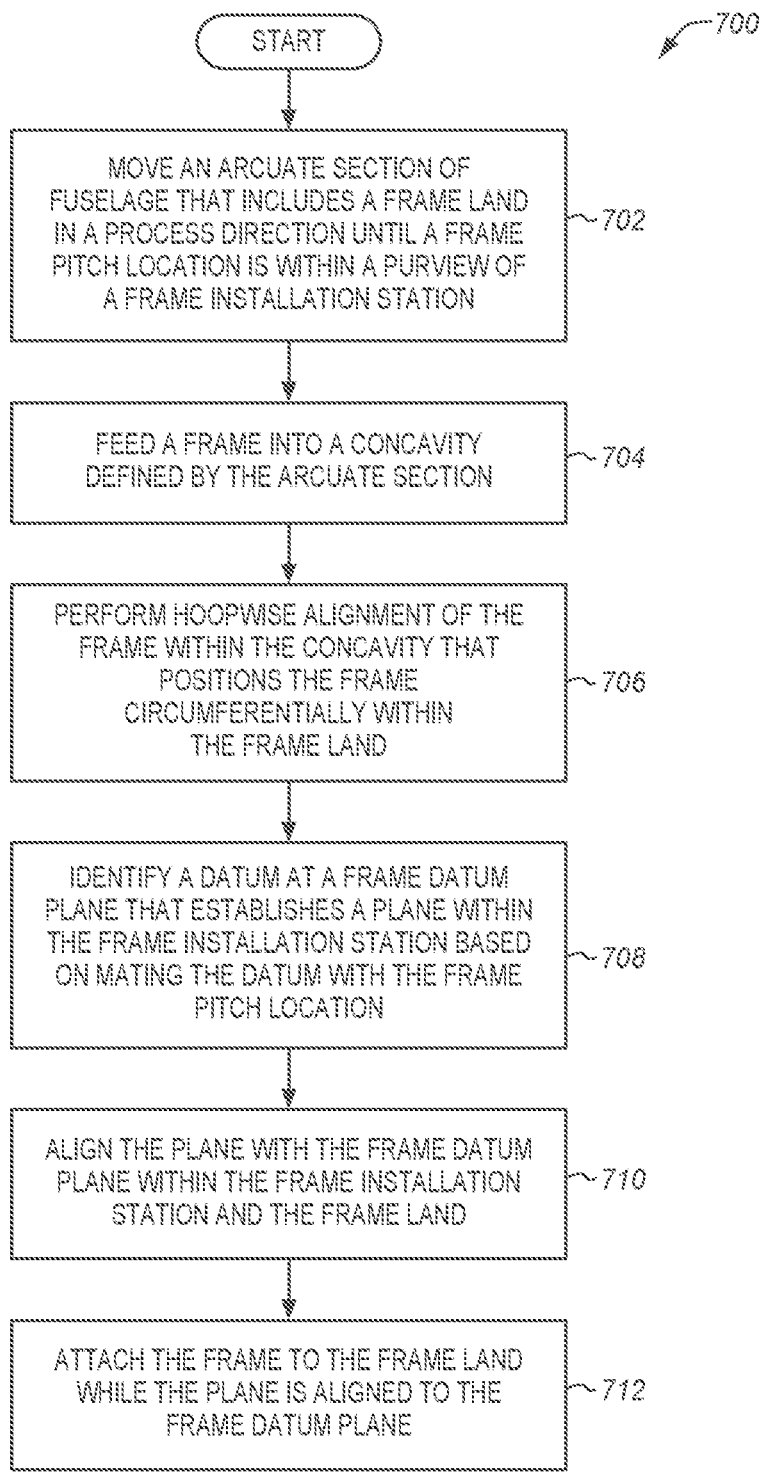
FIG. 7 is a flowchart illustrating a method for acquiring a datum for installing a frame an illustrative embodiment.

FIG. 7 is a flowchart depicting a method 700 of installing a frame in an illustrative embodiment. Step 702 includes moving an arcuate section of fuselage that includes a frame land 692 in a process direction 181 until a frame pitch location (397) is within a purview of a frame installation station. Step 704 includes feeding a frame into a concavity defined by the arcuate section. Step 706 includes performing hoopwise alignment of the frame within the concavity that positions the frame circumferentially within the frame land 692. Step 708 includes identifying a datum at the frame datum plane. Step 708 includes identifying a datum at the frame datum plane that establishes a plane within the frame installation station based on mating the datum with the frame pitch location. In a one embodiment, the datum at the frame is selected from the group consisting of: a flange edge, a flange hole edge, a flange hole centerline, and a web face. In one embodiment, identifying the datum at the frame comprises holding a fastening machine 430 in contact with datum. In a further embodiment, acquiring the datum at the frame comprises holding a loader that feeds the frame in contact with the datum. In yet another embodiment, the datum comprises pins, and establishing the plane comprises slotting Determinant Assembly (D/A) holes at the frame over the pins. Identifying the datum establishes a plane within the frame installation station based on mating the datum with the frame pitch location 397. In one embodiment, establishing the plane comprises holding a hard stop 694 at the frame installation station in contact the datum, and holding the frame in contact with the hard stop 694. Step 710 includes aligning the plane with the frame datum plane 690 within the frame installation station and the frame land 692. Step 712 includes attaching the frame to the frame land 692 while the plane is aligned to the frame datum plane. Attaching the frame to the arcuate section comprises installing fasteners through the frame and the arcuate section.

Figure 8:
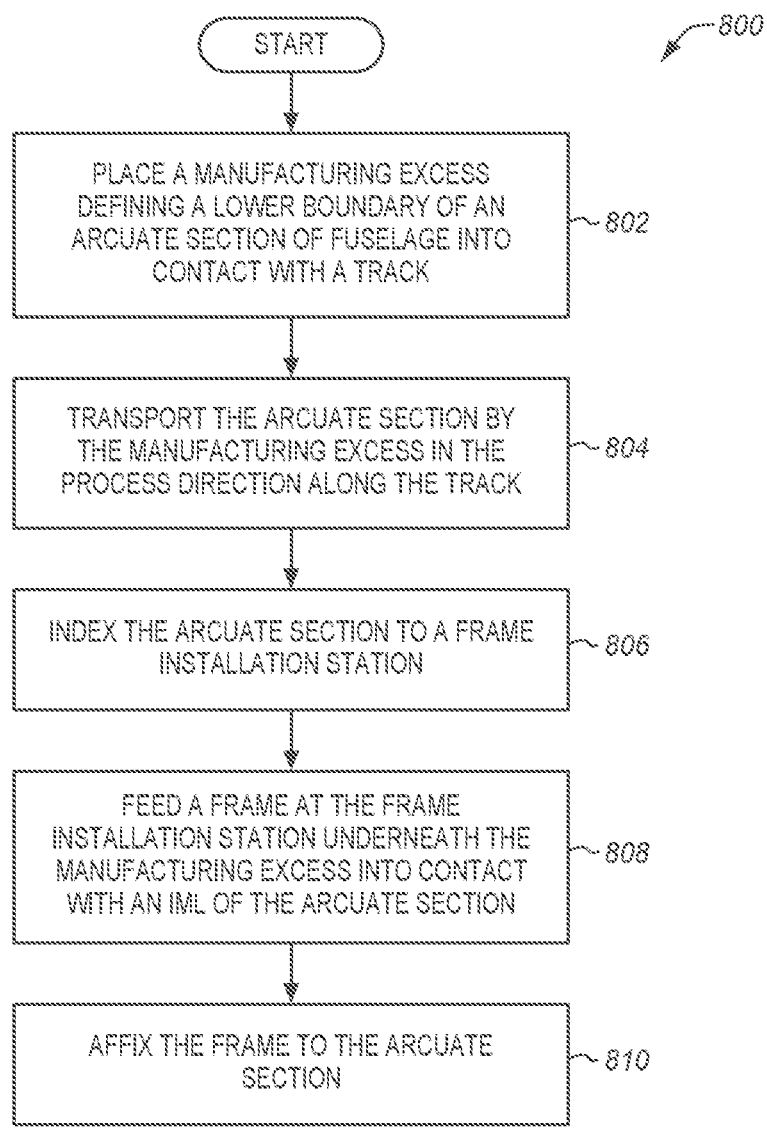
FIG. 8 is a flowchart illustrating a further method for installing a frame an illustrative embodiment.

FIG. 8 is a flowchart illustrating a further method 800 for installing a frame an illustrative embodiment. Step 802 includes placing a manufacturing excess 129 defining a lower boundary of an arcuate section (e.g., half-barrel section 120) of fuselage into contact with a track 110. This provides a bearing surface that is used to traverse the roller system. Step 802 may comprise lowering the arcuate section onto a series of stanchions (e.g., posts 312) after the arcuate section has been demolded from a layup mandrel.

Step 804 includes transporting the arcuate section by the manufacturing excess (129) in a process direction 181 along the track 110. This may comprise driving rollers at the track 110, sliding the arcuate section 120 along the track, etc. Because the manufacturing excess 129 bears the load of the arcuate section, there is no resulting issue if the lower edge of the manufacturing excess 129 becomes worn or uneven during transport, because the manufacturing excess will be cut off before the arcuate section is assembled into a full barrel section.

Step 806 includes indexing the arcuate section to a frame installation station. This step may be performed via any of the indexing techniques and systems discussed above. In step 808, the frame is fed at the frame installation station underneath the manufacturing excess into contact with an Inner Mold Line (IML) of the arcuate section. In embodiments where the track comprises stanchions separated by predetermined distances in the process direction 181, feeding the frame comprises feeding the frame between the stanchions as depicted in FIG. 3. In further embodiments, feeding the frame comprises driving pinch rollers 414 that simultaneously move and rotate the frame. In still further embodiments, feeding the frame at may include moving the frame from an exterior of a left side of the arcuate section to an interior of a right side of the arcuate section, feeding the frame through the track (e.g., underneath or across the track), or rotating the frame.

Step 810 includes affixing the frame to the arcuate section. This may be performed by installing fasteners through the frame and the arcuate section, as discussed above.

Method 800 provides a technical benefit by enabling frames to be rapidly loaded into position for affixation to sections of fuselage, and without a need to lift or re-orient the sections of fuselage as they proceed in a process direction 181. This saves time, and causes transport time to be used to add value to the sections of fuselage.

Figure 9:
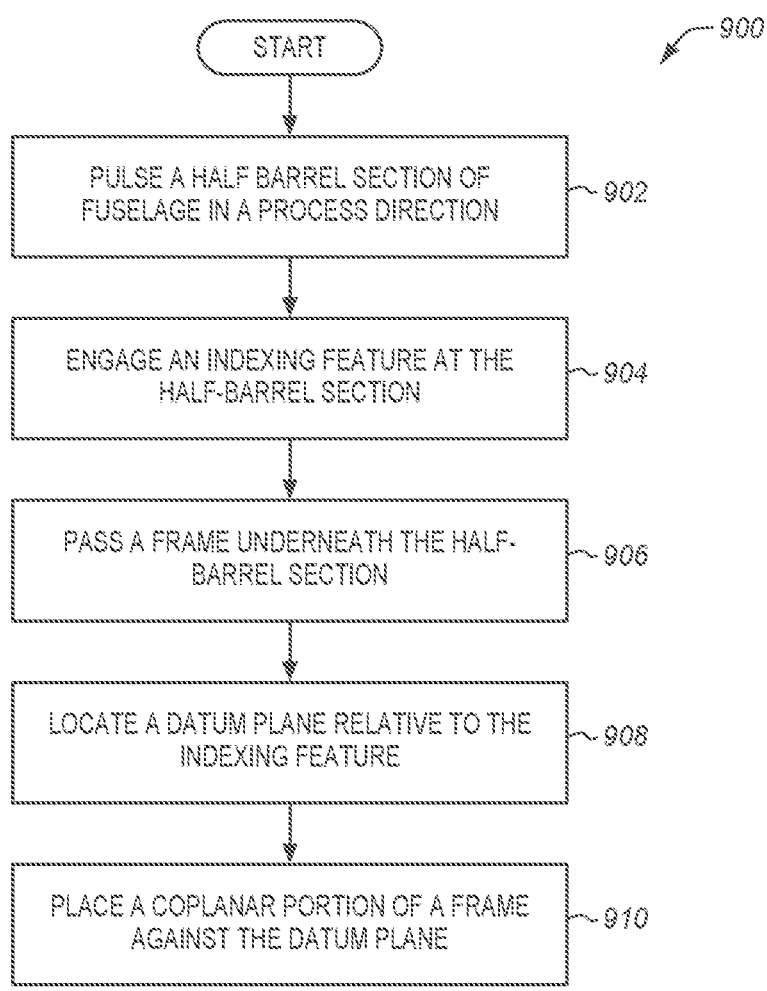
FIG. 9 is a flowchart depicting a method for acquiring a datum plane in an illustrative embodiment.

FIG. 9 is a flowchart depicting a method for acquiring a datum plane 690 in an illustrative embodiment. Step 902 comprises pulsing a half-barrel section of fuselage in a process direction. Step 904 comprises engaging an indexing feature at the half-barrel section. Step 906 comprises passing a frame underneath the half-barrel section. Step 908 comprises locating a datum plane 690 relative to the indexing feature. This may occur automatically when the indexing feature is engaged at the frame installation station, as the frame datum plane 690 need not be a moving part and the indexing feature may or may not be within the datum plane. In step 910, a coplanar portion of the frame is placed against the datum plane 690. In step 910, a coplanar portion of the frame is placed against the frame datum plane 690 and the frame is affixed in place (e.g., a tack fastened into place, affixed via fasteners, etc.). Either side of the frame web, either flange edge, and/or or D/A holes may be used as coplanar entities. For example, a frame installation station may have a datum plane 690 established by three pins that are aligned with D/A holes at the frame.

Like method 800, method 900 provides a technical benefit by enabling frames to be rapidly loaded into position for affixation to sections of fuselage, and without a need to lift or re-orient the sections of fuselage as they proceed in a process direction 181. This saves time, and causes transport time to be used to add value to the sections of fuselage.

Figure 10:
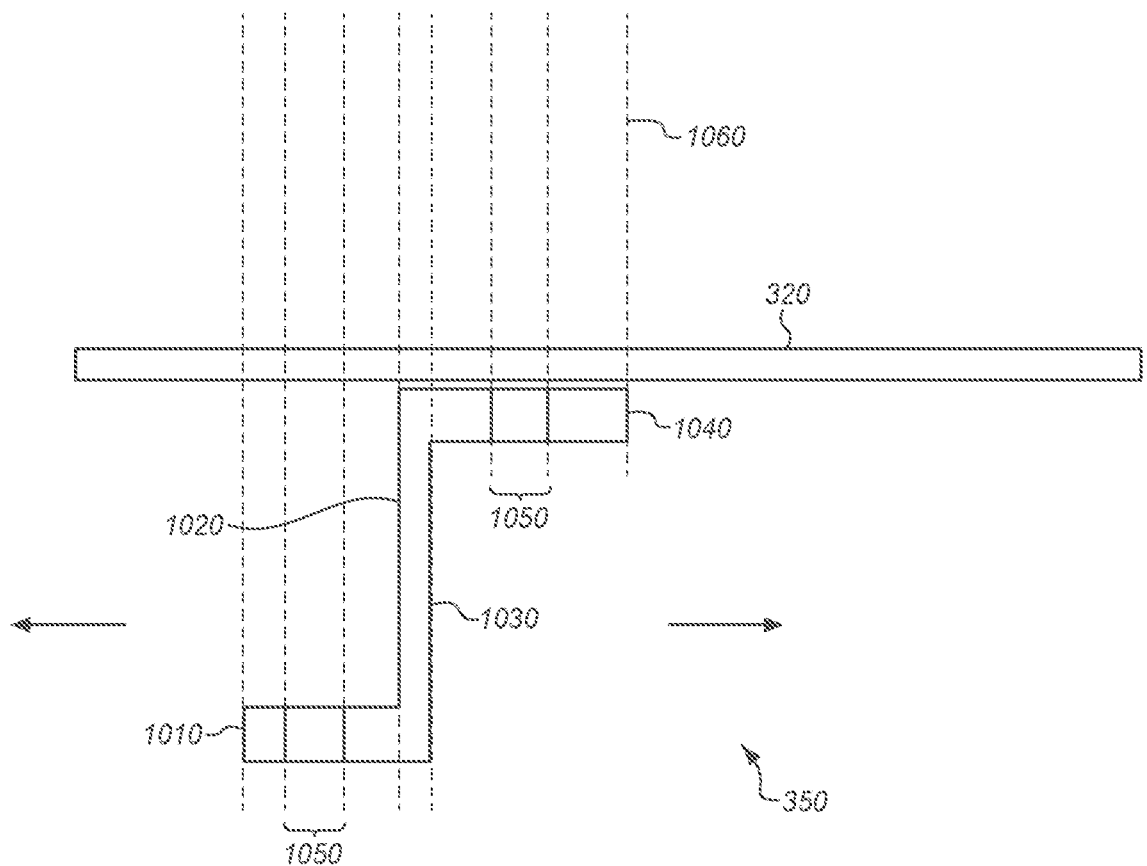
FIG. 10 is an end view of a frame in an illustrative embodiment.

FIG. 10 is an end view of a frame in an illustrative embodiment, and corresponds with view arrows 10 of FIG. 6. As shown in FIG. 10, a frame 350 affixed to a half-barrel section 320 of fuselage. To perform controlled placement in the directions indicated by the arrows, datum planes 1060 may be acquired by making portions of the frame 350 coplanar with hard stops 694, based on laser projection and alignment of the portions etc. In this embodiment, the portions include an outer flange edge 1010, boundaries of D/A hole 1050, an aft portion 1020 of the frame 350, a fore portion of the frame 350, another D/A hole 1050, a face 1030, and an inner flange edge 1040. Any of the faces, forward edges, trailing edges, or centerlines of these portions could be used to establish a frame datum plane, as could any three points defined by these portions. Thus, a variety of arrangements can be used at the frame to align with frame locator data planes. One of the frame datums can be used to align with a plane at a particular frame pitch location 397 relative to the frame install station at one frame pitch location 397, and another datum for another frame pitch location 397, and so on. The datums are established by an arc of at least three points indicated by at least one of the dashed lines shown in FIG. 10. At least three points in the arc establish a frame plane which is aligned with the plane within the frame install station at the frame pitch location 397. In further embodiments, the three points used to establish a datum plane 690 are on the same web face or along the same flange or the same edge of three holes or three center points or a centerline or two aligned holes. These point locations can be sensed with lasers or a hard stop. The hard stop can contact or mate with a flange edge, aligned frame holes, a frame web at three locations, etc.

FIG. 11 is a flowchart illustrating a method 1100 for operating a line assembly system to install frames in an illustrative embodiment. Step 1102 comprises pulsing an arcuate section of fuselage in a process direction 181 along a track, thereby presenting a lengthwise portion of the arcuate section to a station at the track. Step 1104 comprises conveying a three dimensional (3D) characterization of the lengthwise portion to the station during a pause between pulses of the arcuate section. Conveying the 3D characterization can be performed by reading an indexing feature (e.g., an indexing feature 1214 of FIG. 12) in the form of an RFID chip at the arcuate section that identifies the arcuate section (or lengthwise portion thereof), and optionally receiving a scan that characterizes the arcuate section (or the lengthwise portion) in a manner desired in order for the station to perform work. Thus, the 3D characterization describes physical aspects of the IML, and/or OML that are used by the station to perform work at the arcuate section, particularly installing frames. In one embodiment, the 3D characterization indicates a loft of the arcuate section. Step 1106 comprises advancing a frame into the station immediately prior to the station installing the frame. In one embodiment, the frame is advanced into a concavity defined by the arcuate section.

Step 1108 includes installing the frame at the lengthwise portion during the pause. This operation may be performed as discussed above regarding frame installation. In further embodiments, the method further comprises operating multiple stations that perform work on the fuselage section during the pause.

FIG. 12 is a diagram 1200 that depicts indexing of a component 1210 to a work station 1220 in an illustrative embodiment. The component has a length L1, and is advanced along its length L1 (e.g., via a track or drive) either continuously or in a pulsed fashion. In one embodiment, the component is "micro pulsed" and advances by a pulse distance P that corresponds with the length L2 of lengthwise portions 1212. In a pulsed embodiment, the work station 1220 operates on the component 1210 during pauses between pulses, or during pulsed motion of the component 1210. In an embodiment where the component 1210 continuously advances, the work station 1220 operates on the component during the continuous motion.

The lengthwise portions 1212 are accompanied by indexing features 1214. In this embodiment, the indexing features 1214 are evenly spaced and are located on the lengthwise portions 1212. However, in further embodiments the indexing features 1214 are spaced at different intervals, and are placed outside of the lengthwise portions 1212 (e.g., at a tray carrying the component). The indexing features 1214 comprise any suitable shapes and sizes, and in one embodiment, the spacing, shape, size, and number of the indexing features 1214 at a given location conveys an instruction for the work station 1220 to operate, operate in a specific manner, or refrain from operating upon the lengthwise portion 1213 that is currently exposed to the work station 1220. The arrangement of the indexing features 1214, because they are fixed relative to the component 1210 and are disposed at predetermined locations at the component 1210, can also be utilized to determine a 3D characterization of a position, orientation, loft, Inner Mold Line (IML), Outer Mold Line (OML), or other aspect of the component 1210.

In one embodiment, indexing units 1224 physically couple with, physically interact with the indexing features 1214, while in a further embodiment the indexing units 1224 scan the indexing features 1214 via optical means, by applying acoustic energy, by applying electromagnetic energy, or by other means. After the position and/or orientation of the indexing features 1214 for a lengthwise portion 1213 currently disposed at the work station 1220 has been determined, an end effector 1222 is positioned based on this information in order to perform work at the lengthwise portion 1212 in a repeatable, accurate, and precise manner. By iteratively advancing, indexing, and performing work on the component, the entire component 1210 receives work from the work station 1220. In further embodiments, a plurality of work stations 1220 are disposed along the length of the component 1210, and perform work synchronously (e.g., during the same pause) at different lengthwise portions of the component. Feeder lines 1230 provide materials 1232 to the work station 1220 in a Just in Time (JIT) manner. FIGS. 13A-13B are flowcharts illustrating further methods for operating a line assembly system to install frames in an illustrative embodiment. Method 1300 of FIG. 13 includes, at step 1302, advancing an arcuate section of a fuselage along a track 310 in a process direction 181 by less than a length of the arcuate section. In one embodiment, advancing the arcuate section comprises pulsing the arcuate section in the process direction 181. In a further embodiment, the arcuate section comprises a half-barrel section 320, and the method is performed while bearing edges 329 of the half-barrel section contact the track. Step 1304 includes installing a frame 350 at a lengthwise portion of the arcuate section within a purview of a frame installation station at the track 310. The frames are installed at frame pitch locations 397. In one embodiment, installing the frame comprises feeding the frame longitudinally under the arcuate section, followed by attaching the frame to the arcuate section via fasteners.

Step 1306 includes advancing the arcuate section further in the process direction 181. Step 1308 includes cutting out material from the lengthwise portion at a cut-out station (e.g., cut-out station 370 of FIG. 3) that is disposed downstream of the frame installation station. In one embodiment, cutting out the material from the lengthwise portion comprises cutting out an opening for a window or an opening for a door, or trimming off the remaining manufacturing excess/bearing edge.

Method 1350 describes a further illustrative embodiment. Step 1352 of method 1350 includes pulsing an arcuate section of a fuselage by a portion of a length of the arcuate section. In one embodiment, the arcuate section comprises a half-barrel section 320, and the method is performed while bearing edges 329 of the half-barrel section contact a track 310. Step 1352 therefore involves driving the arcuate section along the track 310. Step 1354 includes installing a frame 350 at a first lengthwise portion of the arcuate section within a purview of a frame installation station, during a pause between pulses of the arcuate section. Step 1354 includes installing a frame 350 at a first lengthwise portion of the arcuate section within a purview of a frame installation station, such as by installing frames at frame pitch locations 397 during a pause between pulses of the arcuate section. In one embodiment, installing the frame 350 comprises feeding the frame 350 longitudinally under the arcuate section, followed by attaching the frame to the arcuate section via fasteners.

In step 1356, a cut-out station 370 cuts out material from a second lengthwise portion within a purview of a cut-out station that is disposed downstream of the frame installation station, during the pause. In one embodiment, cutting out the material from the lengthwise portion comprises cutting out an opening for a window or an opening for a door, or trimming off a remaining manufacturing excess/bearing edge.

FIG. 14 is a further flowchart illustrating a method 1400 for operating a line assembly system to install frames in an illustrative embodiment. Step 1402 includes moving a frame land 692 in an arcuate section of fuselage into a frame installation station. Step 1404 includes feeding a frame into a concavity defined by the arcuate section. Step 1406 includes placing a frame flange against the frame land 692. Step 1408 includes placing a frame datum against a hard stop 694. Step 1410 includes fastening the frame to the arcuate section of fuselage.

In one embodiment, the method further comprises clamping the frame into place against the frame land 692 prior to fastener install. In a further embodiment, the method further comprises utilizing the hard stop (694) to establish a plane within the frame install station that aligns with the frame datum. In another embodiment, the method further comprises mating the frame to a frame pitch location 397. In yet another embodiment, the method further comprises pulsing the arcuate section by less than a length of the arcuate section. In a still further embodiment, the method includes indexing the arcuate section to the frame installation station during the pulsing, and characterizing the arcuate section based on the indexing.

EXAMPLES

In the following examples, additional processes, systems, and methods are described in the context of a frame installation station.

Referring more particularly to the drawings, embodiments of the disclosure may be described in the context of aircraft manufacturing and service in method 1500 as shown in FIG. 15 and an aircraft 1502 as shown in FIG. 16. During pre-production, method 1500 may include specification and design 1504 of the aircraft 1502 and material procurement 1506. During production, component and subassembly manufacturing 1508 and system integration 1510 of the aircraft 1502 takes place. Thereafter, the aircraft 1502 may go through certification and delivery 1512 in order to be placed in service 1514. While in service by a customer, the aircraft 1502 is scheduled for routine work in maintenance and service 1516 (which may also include modification, reconfiguration, refurbishment, and so on). Apparatus and methods embodied herein may be employed during any one or more suitable stages of the production and service described in method 1500 (e.g., specification and design 1504, material procurement 1506, component and subassembly manufacturing 1508, system integration 1510, certification and delivery 1512, service 1514, maintenance and service 1516) and/or any suitable component of aircraft 1502 (e.g., airframe 1518, systems 1520, interior 1522, propulsion system 1524, electrical system 1526, hydraulic system 1528, environmental 1530).

Each of the processes of method 1500 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 16, the aircraft 1502 produced by method 1500 may include an airframe 1518 with a plurality of systems 1520 and an interior 1522. Examples of systems 1520 include one or more of a propulsion system 1524, an electrical system 1526, a hydraulic system 1528, and an environmental system 1530. Any number of other systems may be included. Although an aerospace example is shown, the principles of the invention may be applied to other industries, such as the automotive industry.

Now turning to FIG. 17, an illustration of an aircraft 1700 is depicted in which an illustrative embodiment may be implemented. Aircraft 1700 is an example of an aircraft which can be formed of a plurality of half-barrel sections 1702 to form a main portion of the fuselage 1704 using the methods described herein.

In this embodiment, aircraft 1700 has wings 1706 and 1708 attached to a body 1710. Aircraft 1700 includes an engine 1712 attached to wing 1706 and an engine 1714 attached to wing 1708. The body 1710 has a tail section 1716. A horizontal stabilizer 1718, a horizontal stabilizer 1720, and a vertical stabilizer 1722 are attached to the tail section 1716 of the body 1710.

Fuselage 1704 is fabricated from half-barrel sections 1702 defining an upper half-barrel section joined to a lower half-barrel section to form a complete full-barrel section.

As already mentioned above, apparatus and methods embodied herein may be employed during any one or more of the stages of the production and service described in method 1500. For example, components or subassemblies corresponding to component and subassembly manufacturing 1508 may be fabricated or manufactured in a manner similar to components or subassemblies produced while the aircraft 1502 is in service. Also, one or more apparatus embodiments, method embodiments, or a combination thereof may be utilized during the subassembly manufacturing 1508 and system integration 1510, for example, by substantially expediting assembly of or reducing the cost of an aircraft 1502. Similarly, one or more of apparatus embodiments, method embodiments, or a combination thereof may be utilized while the aircraft 1502 is in service, for example and without limitation during the maintenance and service 1516. For example, the techniques and systems described herein may be used for material procurement 1506, component and subassembly manufacturing 1508, system integration 1510, service 1514, and/or maintenance and service 1516, and/or may be used for airframe 1518 and/or interior 1522. These techniques and systems may even be utilized for systems 1520, including, for example, propulsion system 1524, electrical system 1526, hydraulic 1528, and/or environmental system 1530.

In one embodiment, a part comprises a portion of airframe 1518, and is manufactured during component and subassembly manufacturing 1508. The part may then be assembled into an aircraft in system integration 1510, and then be utilized in service 1514 until wear renders the part unusable. Then, in maintenance and service 1516, the part may be discarded and replaced with a newly manufactured part. Inventive components and methods may be utilized throughout component and subassembly manufacturing 1508 in order to manufacture new parts.

Any of the various control elements (e.g., electrical or electronic components) shown in the figures or described herein may be implemented as hardware, a processor implementing software, a processor implementing firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, a control element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments are described herein, the scope of the disclosure is not limited to those specific embodiments. The scope of the disclosure is defined by the following claims and any equivalents thereof.

What is claimed is:

1. A method for assembling a fuselage of an aircraft, the method comprising:

moving an arcuate section of the fuselage that includes a frame land in a process direction until a frame pitch location is within a purview of a frame installation station;

feeding a frame into a concavity defined by the arcuate section by feeding the frame through a gap in a loader located underneath a lower most bottom edge of a half-barrel section;

performing hoopwise alignment of the frame within the concavity that positions the frame circumferentially within the frame land;

identifying a datum at a frame datum plane that establishes a plane within the frame installation station based on mating the datum with the frame pitch location;

aligning the plane with the frame datum plane within the frame installation station and the frame land; and attaching the frame to the frame land while the plane is aligned to the frame datum plane.

2. The method of claim 1 wherein:

the datum at the frame is selected from the group consisting of a flange edge, a flange hole edge, a flange hole centerline, and a web face.

3. The method of claim 1 wherein:

the identifying the datum at the frame comprises holding the loader that feeds the frame in contact with the datum.

4. The method of claim 1 further comprising:

using the loader to hold the frame within the frame land.

5. The method of claim 1 wherein:

the establishing the plane within the frame installation station comprises holding a hard stop at the frame installation station in contact with the datum, and holding the frame in contact with the hard stop.

6. The method of claim 1 wherein:

the datum comprises pins, and establishing the plane comprises slotting Determinant Assembly (D/A) holes at the frame over the pins.

7. The method of claim 1 wherein:

attaching the frame comprises installing fasteners through the frame and the arcuate section.

8. A method for assembling a fuselage of an aircraft, the method comprising:

moving an arcuate section of the fuselage that includes a frame land in a process direction until a frame pitch location is within a purview of a frame installation station;

feeding a frame into a concavity defined by the arcuate section by feeding the frame through a gap in a loader located underneath a lower most bottom edge of a half-barrel section;

performing hoopwise alignment of the frame within the concavity that positions the frame circumferentially within the frame land;

identifying a datum at a frame datum plane that establishes a plane within the frame installation station based on mating the datum with the frame pitch location;

aligning the plane with the frame datum plane within the frame installation station and the frame land; and attaching the frame to the frame land while the plane is aligned to the frame datum plane, wherein the datum at the frame is selected from the group consisting of a flange edge, a flange hole edge, and a flange hole centerline.

9. The method of claim 8 wherein:

the identifying the datum at the frame comprises holding the loader that feeds the frame in contact with the datum, and attaching the frame comprises installing fasteners through the frame and the arcuate section.

10. The method of claim 8 wherein:

the identifying the datum at the frame comprises holding the loader that feeds the frame in contact with the datum.

11. The method of claim 8 further comprising:

using the loader to hold the frame within the frame land.

12. The method of claim 8 wherein:

the establishing the plane within the frame installation station comprises holding a hard stop at the frame installation station in contact with the datum, and holding the frame in contact with the hard stop.

13. The method of claim 8 wherein:

the datum comprises pins, and establishing the plane comprises slotting Determinant Assembly (D/A) holes at the frame over the pins.

14. The method of claim 8 wherein:

attaching the frame comprises installing fasteners through the frame and the arcuate section.

15. A method for assembling a fuselage of an aircraft, the method comprising:

moving an arcuate section of the fuselage that includes a frame land in a process direction until a frame pitch location is within a purview of a frame installation station;

feeding a frame into a concavity defined by the arcuate section by feeding the frame through a gap in a loader located underneath a lower most bottom edge of a half-barrel section;

performing hoopwise alignment of the frame within the concavity that positions the frame circumferentially within the frame land;

identifying a datum at a frame datum plane that establishes a plane within the frame installation station based on mating the datum with the frame pitch location;

aligning the plane with the frame datum plane within the frame installation station and the frame land; and attaching the frame to the frame land while the plane is aligned to the frame datum plane, wherein the datum at the frame is selected from the group consisting of a flange hole edge, and a flange hole centerline.

16. The method of claim 15 wherein:

the identifying the datum at the frame comprises holding the loader that feeds the frame in contact with the datum.

17. The method of claim 15 further comprising:

using the loader to hold the frame within the frame land.

18. The method of claim 15 wherein:

the establishing the plane within the frame installation station comprises holding a hard stop at the frame installation station in contact with the datum, and holding the frame in contact with the hard stop.

19. The method of claim 15 wherein:

the datum comprises pins, and establishing the plane comprises slotting Determinant Assembly (D/A) holes at the frame over the pins.

20. The method of claim 15 wherein:

attaching the frame comprises installing fasteners through the frame and the arcuate section.

21. The method of claim 15 wherein:

the identifying the datum at the frame comprises holding the loader that feeds the frame in contact with the datum, and attaching the frame comprises installing fasteners through the frame and the arcuate section.

* * * * *